(12) United States Patent
Ikuno

(10) Patent No.: US 8,979,452 B2
(45) Date of Patent: Mar. 17, 2015

(54) ANCHOR BOLT, ANCHOR, CONNECTING NUT AND CLAMPING NUT

(75) Inventor: Makoto Ikuno, Osaka (JP)

(73) Assignee: N-Pat Co., Ltd., Osaka-Shi, Osaka (JP)

( * ) Notice: Subject to any disclaimer, the term of this patent is extended or adjusted under 35 U.S.C. 154(b) by 323 days.

(21) Appl. No.: 13/363,992

(22) Filed: Feb. 1, 2012

(65) Prior Publication Data

US 2012/0201625 A1    Aug. 9, 2012

(30) Foreign Application Priority Data

Feb. 4, 2011  (JP) ................................. 2011-022260
Jun. 14, 2011  (JP) ................................. 2011-132042

(51) Int. Cl.
*F16B 31/00* (2006.01)
*F16B 13/06* (2006.01)
*F16B 31/02* (2006.01)

(52) U.S. Cl.
CPC ............. *F16B 13/066* (2013.01); *F16B 31/021* (2013.01)
USPC .................................................. 411/5; 411/55

(58) Field of Classification Search
USPC ......... 411/2, 5, 34, 35, 60.2, 39–44, 55, 57.1, 411/80.5, 397
See application file for complete search history.

(56) References Cited

U.S. PATENT DOCUMENTS

| | | | |
|---|---|---|---|
| 2,747,454 A | 5/1956 | Bowersett | |
| 3,174,385 A * | 3/1965 | Hallowell, Jr. | 411/2 |
| 3,370,341 A * | 2/1968 | Allsop | 29/413 |
| 3,444,775 A * | 5/1969 | Hills | 411/5 |
| 3,512,447 A * | 5/1970 | Vaughn | 411/5 |
| 4,091,841 A * | 5/1978 | Beneker et al. | 138/89 |
| 4,122,753 A * | 10/1978 | Kuhlmann et al. | 411/2 |
| 4,413,930 A | 11/1983 | Calandra, Jr. | |
| 4,484,849 A * | 11/1984 | Klimowicz | 411/397 |
| 4,679,966 A * | 7/1987 | Yacisin | 405/259.6 |
| 4,904,135 A | 2/1990 | Barthomeuf et al. | |
| 4,969,778 A | 11/1990 | Calandra et al. | |
| 5,244,314 A | 9/1993 | Calandra et al. | |
| 5,255,896 A * | 10/1993 | Letarte et al. | 256/10 |

(Continued)

FOREIGN PATENT DOCUMENTS

DE    25 47 634    4/1977
DE    2658996    6/1978

(Continued)

OTHER PUBLICATIONS

Extended European Search Report issued in corresponding European Patent Application No. 13153643.5-1758, dated Apr. 29, 2013.

(Continued)

*Primary Examiner* — Gary Estremsky
(74) *Attorney, Agent, or Firm* — Buchanan Ingersoll & Rooney PC

(57) ABSTRACT

An anchor bolt comprising: a shaft part with a male screw thread; and a head part connected to the shaft part and having an attachment hole with a closed-end bottom to receive a bolt therein defined at a tip surface of the head part and a breaking groove provided at an outer side surface of the head part. The breaking groove is formed at an outer surface of a portion in which the attachment hole is defined. A torque equal to or greater than a fixed value exerted on a tip portion between the tip surface and the breaking groove of the head part causes the breaking groove to be broken, thereby causing the tip portion between the tip surface and the breaking groove of the head part to be removed.

22 Claims, 25 Drawing Sheets

(56) References Cited

U.S. PATENT DOCUMENTS

| | | | |
|---|---|---|---|
| 5,284,409 A * | 2/1994 | Miyanaga | 411/55 |
| 5,746,556 A | 5/1998 | Sato | |
| 5,993,129 A | 11/1999 | Sato | |
| 6,056,471 A * | 5/2000 | Dinitz | 403/2 |
| 6,224,596 B1 * | 5/2001 | Jackson | 606/264 |
| 6,261,039 B1 * | 7/2001 | Reed | 411/178 |
| 7,357,613 B2 * | 4/2008 | Houck et al. | 411/60.3 |
| 8,087,850 B2 * | 1/2012 | Craig | 405/259.4 |
| 2004/0191004 A1 | 9/2004 | Cook | |
| 2005/0123375 A1 | 6/2005 | Ramasamy | |
| 2010/0278593 A1 | 11/2010 | Cook | |
| 2013/0202364 A1 | 8/2013 | Ikuno | |

FOREIGN PATENT DOCUMENTS

| | | |
|---|---|---|
| EP | 0 332 496 | 9/1989 |
| EP | 0 470 470 | 2/1992 |
| EP | 0 470 470 A2 | 2/1992 |
| EP | 0 732 515 A1 | 9/1996 |
| EP | 0 834 658 A2 | 4/1998 |
| EP | 2 112 383 | 10/2009 |
| EP | 2 484 922 | 8/2012 |
| GB | 1 517 657 | 7/1978 |
| JP | 9-071934 A | 3/1997 |
| JP | 10-110475 A | 4/1998 |
| JP | 10-231583 A | 9/1998 |
| JP | 2002-070178 | 3/2002 |
| JP | 2006-219908 A | 8/2006 |
| JP | 2008-185076 A | 8/2008 |
| JP | 2009-138341 A | 6/2009 |
| JP | 2011-111715 A | 6/2011 |
| WO | 2006/034208 | 3/2006 |
| WO | 2011/137955 | 11/2011 |

OTHER PUBLICATIONS

Official Action issued in U.S. Appl. No. 13/757,403, dated Nov. 20, 2013.

European Search Report dated Apr. 26, 2013, issued in corresponding European Patent Application No. 12153806.0 (5 pages).

Office Action dated Dec. 16, 2014, issued by the Japanese Patent Office in corresponding Japanese Patent Application No. 2011-132042, and an English translation of the Office Action. (5 pages).

* cited by examiner

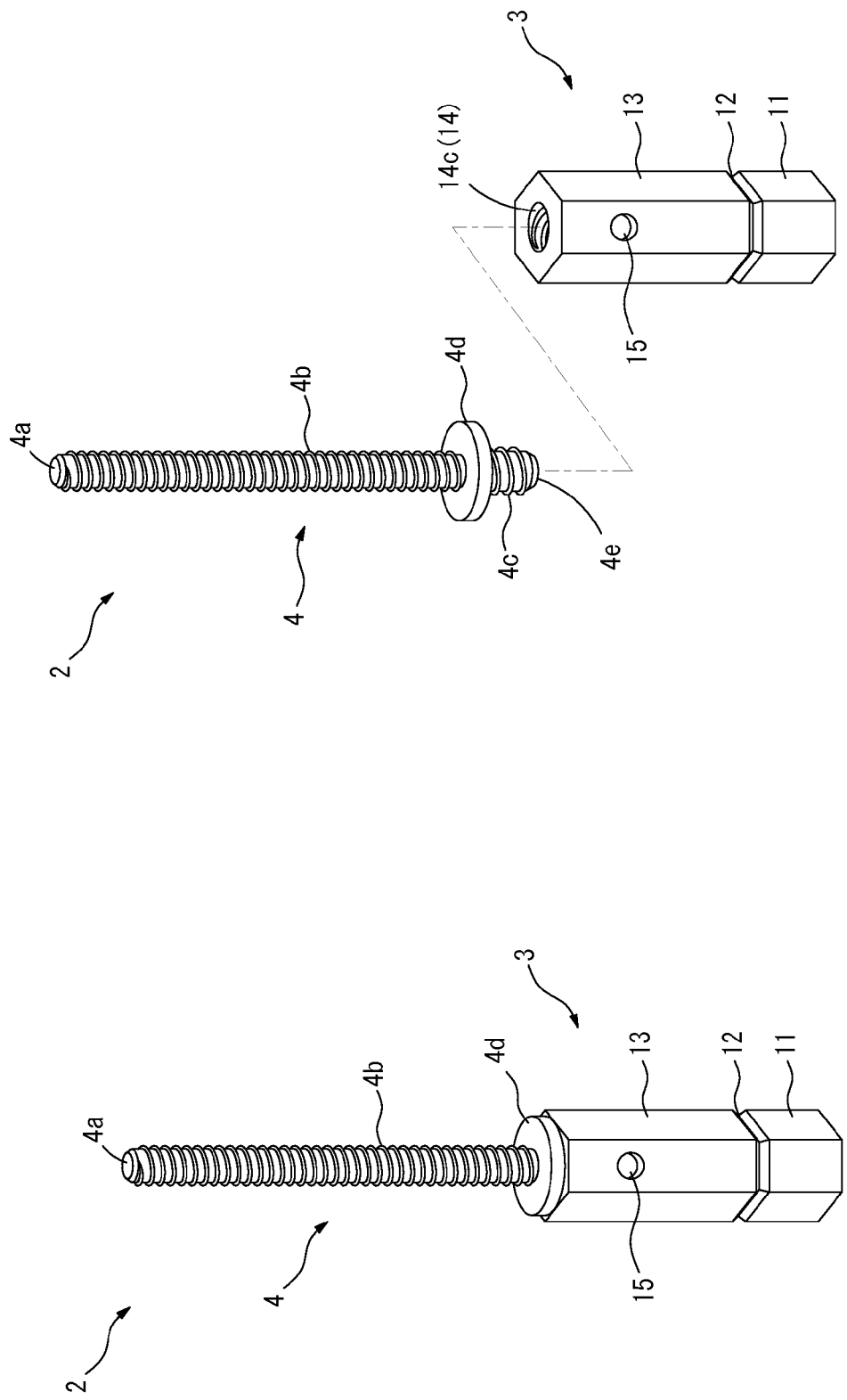

ANCHOR BOLT, ANCHOR, CONNECTING NUT AND CLAMPING NUT

This application is based on the applications No. 2011-022260 and No. 2011-132042 filed in Japan, the contents of which are hereby incorporated by reference.

BACKGROUND OF THE INVENTION

1. Field of the Invention

The present invention relates to an anchor bolt, a connecting nut, a clamping nut and an anchor to be attached to various types of skeletons such as concrete buildings and structures.

2. Background Art

In order to attach hanging objects such as air conditioners, lighting fixtures, and various types of pipes to an existing ceiling structure of a building such as that made of concrete, anchors intended to support the hanging objects are fixed to the ceiling structure. The anchors are fixed to not only the ceiling structure but also surfaces such as that of a wall or a floor. Conventionally known anchors used for this purpose are disclosed for example in Japanese Patent Application Laid-Open No. 10-231583 (1998) (patent literature 1), and in Japanese Patent Application Laid-Open No. 10-110475 (1998) (patent literature 2).

Referring for example to the anchor disclosed in patent literature 1, it includes a spreading sleeve, and a cone nut in the form of a truncated cone. The spreading sleeve is swaged to be integrated with a tip portion of a steel bar, and in which multiple slits extending in the axial direction from the tip of the spreading sleeve are defined. The edge of a smaller diameter of the cone nut is press-fitted into a tip portion of the spreading sleeve. Regarding placement of this anchor, the anchor is inserted into a concrete hole with the cone nut placed nearest the hole. Then, with the tip of the cone nut in contact with a bottom portion of the hole, the steel bar is struck for example with a hammer to drive the anchor into the hole. The strike with a hammer presses the cone nut into the spreading sleeve, so that the tip portion of the spreading sleeve spreads outwardly in the radius direction while cutting into a concrete wall and the like along the tapered surface of the cone nut. As a result, the anchor is fixed to a skeleton.

Referring to the anchor disclosed in patent literature 2, it includes an anchor socket fixedly pressed-fitted into a concrete hole, and an anchor bolt threaded into the anchor socket through an opening at one end portion of the anchor socket. A slit is defined in an opposite end portion of the anchor socket. A head is integrally provided at a tip portion of the shank of a shaft part of the anchor bolt. The head is press-fitted into the inner circumference of the opposite end portion of the anchor socket to causes the opposite end portion to spread. Regarding placement of this anchor, the anchor socket is inserted in advance into a concrete hole with the opposite end portion placed nearest the hole. Then, the anchor bolt is threadedly inserted into the anchor socket through the opening at the one end portion of the anchor socket. In response to the threaded insertion of the anchor bolt, the head at the tip portion of the anchor bolt causes the opposite end portion of the anchor socket to spread, thereby fixing the anchor.

SUMMARY OF THE INVENTION

The anchor disclosed in patent literature 1 is not suited for fixation to a ceiling structure. The reason therefor is that, in the anchor of patent literature 1, the steel bar suspended from the ceiling structure, and the cone nut press-fitted into the tip portion of the spreading sleeve are structurally separated. So, if the ceiling structure is shaken strongly for example by an earthquake, the cone nut falls off the inside of the spreading sleeve, resulting in a fear of drop of the spreading sleeve integrated with the tip portion of the steel bar from the ceiling structure.

Meanwhile, the anchor of patent literature 2 includes the head provided integrally with the anchor bolt, and which causes the anchor socket to spread. Thus, there is no fear of drop of the anchor bolt, so that the anchor of patent literature 2 does not suffer from the problem generated in patent literature 1.

Placement of the anchor of patent literature 2 on a ceiling structure, or a wall or a floor requires insertion of the anchor bolt into the anchor socket through the opening at the one end portion of the anchor socket, and rotation of the inserted anchor bolt. This process generates a problem as one cannot check to see visually if the head has caused the anchor socket to spread to its normal placement condition. In particular, for placement of this anchor on a ceiling structure, a worker may insert the anchor into a defined hole in the ceiling structure with an extension tool from a floor, and then rotate the inserted anchor. This placement process makes a distance between the eyes of the worker and the anchor greater, so visual check is made more difficult. So, according to a generally and conventionally employed way, determination as to whether the anchor of patent literature 2 is firmly fixed should be made based on whether the rotation torque of the anchor bolt has reached a fixed value. The rotation torque of the anchor bolt having reached the fixed value during the process means completion of the placement.

The worker relies heavily on his experience for management of the rotation torque. This easily causes unevenness of the placing quality of anchors, while making it difficult to find faulty placement even if it is generated.

Recently, a field supervisor may check the placement condition of each anchor after multiple anchors are placed on a ceiling structure or a surface such as a wall or a floor. To be specific, the field supervisor should check the placed anchors one by one with a torque wrench and the like to see if the rotation torques thereof are at the fixed value or more, resulting in an excessive work burden and significant time-consuming for the work. In particular, the field supervisor has to climb up to the height of the ceiling structure to check the placement conditions of the anchors one by one when the anchor is placed on the ceiling structure, resulting in a further excessive work burden. Meanwhile, in many cases, the height of the ceiling structure is five meters or more in the case of large-scale buildings such as school facilities, hospitals, and commercial buildings. So, this checking process is attended with danger. The conventional anchor involves an intolerable inconvenience in terms of management of placement.

The present invention has been made to solve the aforementioned problems. It is an object of the present invention to provide an anchor bolt, an anchor, a connecting nut and a clumping nut that make check of the placement condition of the anchor easy to realize efficient and safe check after the placement of the anchor.

In order to solve the aforementioned problems, first, the present invention is directed to an anchor bolt. According to one structure of the anchor bolt of the present invention, the anchor bolt comprises: a shaft part with a male screw thread; and a head part connected to the shaft part and having an attachment hole with a closed-end bottom to receive a bolt therein defined at a tip surface of the head part and a breaking groove provided at an outer side surface of the head part. The breaking groove is formed at an outer surface of a portion in which the attachment hole is defined. A torque equal to or greater than a fixed value exerted on a tip portion between the tip surface and the breaking groove of the head part causes the breaking groove to be broken, thereby causing the tip portion between the tip surface and the breaking groove of the head part to be removed.

According to the anchor bolt described above, the head part has a diameter reduction section having an inner diameter that reduces at a predetermined depth in the attachment hole from the tip surface, and a screw hole section with a female screw thread provided at a bottom portion between the diameter reduction section and a bottom surface. The breaking groove is preferably placed at a predetermined position closer to the tip surface than the portion in which the diameter reduction section is formed.

In this structure, the breaking groove is placed at the tip portion between the tip surface and the diameter reduction section of the attachment hole with a closed-end bottom. This structure makes a female screw thread of the screw hole section not to be broken at breaking in the breaking groove.

The anchor bolt of the above-described structure further comprises a cap member set in the attachment hole to close the attachment hole. The cap member is preferably removed from the head part together with the tip portion between the tip surface and the breaking groove of the head part at the time of breaking in the breaking groove.

The cap member preferably includes a wall section contacted by an inner side surface of the attachment hole in the breaking groove. In this structure, the wall section of the cap member presses the broken portion from inside when the breaking groove is broken. This structure prevents unnecessary breaking projection to be created.

According to the head part of the anchor bolt described above, the tip portion between the tip surface and the breaking groove is preferably formed as a tool attachment section for rotation control, and a body portion between the breaking groove and the shaft part being in form of a cylinder.

According to the anchor bolt described above, the head part has a through hole communicatively coupled to the outer side surface of the head part. The through hole is defined in the bottom portion and its vicinity of the attachment hole. The bottom portion of the attachment hole is provided with a deformable material that deforms in response to attachment of the bolt. The attachment of the bolt to the attachment hole preferably causes the deformable material to deform and one part of the deformable material to project outside through the through hole.

The above-described deformable material may be a flexible material made of oil-based clay colored in a certain color. The deformable material is not necessary to be the flexible material. The deformable material may include an attachment part attached to the bottom portion of the screw hole and a flexible part bended in advance into substantial V-shape. With this structure, one end portion of the flexible part may be fixed to the attachment part while opposite end portion is placed at a position, facing the through hole. In this case, preferably, the flexible part is caused to expand the bended portion in response to the attachment of the bolt, thereby allowing the opposite end portion placed facing the through hole to project outside from the through hole.

Second, the present invention is directed to an anchor including an anchor bolt. According to one structure of the anchor of the present invention, the anchor comprises an anchor bolt including a shaft part with a male screw thread, and a head part provided at a base portion of the shaft part, the head part having a diameter larger than an outer diameter of the shaft part; a spreading sleeve including spreading parts formed at a tip portion of a tubular body that permits the shaft part to pass therethrough, the spreading parts being formed by a longitudinally cut slot in such a manner that the spreading parts spread outwardly; and a cone nut having an outer diameter of which gradually reduces in the axial direction of the shaft part, the cone nut including a screw through hole defined therein to threadedly engage the male screw thread of the shaft part, the cone nut being attached to the shaft part with an edge of a smaller diameter of the cone nut engaging in a tip portion of the spreading sleeve. The anchor bolt includes an attachment hole with a closed-end bottom to receive a bolt therein defined at a tip surface of the head part and a breaking groove provided at an outer side surface of the head part, the breaking groove being placed at a predetermined position at an outer surface of a portion in which the attachment hole is defined. The anchor bolt causes the shaft part to rotate in response to rotation of a tip portion between the tip surface and the breaking groove of the head part to drive the cone nut into the spreading sleeve, thereby causing the spreading parts to spread outwardly. Further, a torque equal to or greater than a fixed value exerted on the tip portion between the tip surface and the breaking groove of the head part causes the breaking groove to be broken, thereby causing the tip portion between the tip surface and the breaking groove of the head part to be removed.

According to the anchor described above, the anchor bolt of aforementioned structure may be used. The anchor bolt with the cap member set in the attachment hole may be used, for example.

Third, the present invention is directed to a connecting nut formed by a metal member of a predetermined length in the axial direction that includes a first attachment hole defined at one end surface and a second attachment hole defined at an opposite end surface, a different bolt being attached to each of the first and second attachment hole. According to one structure of the connecting nut of the present invention, the connecting nut includes a breaking groove provided at an outer side surface of the metal member, the breaking groove being placed at a predetermined position at an outer surface of a portion in which the first attachment hole is defined. A torque equal to or greater than a fixed value exerted on one end portion between the one end surface and the breaking groove causes the breaking groove to be broken, thereby causing the one end portion between the one end surface and the breaking groove of the metal member to be removed.

According to the connecting nut described above, the first attachment hole includes a diameter reduction section having an inner diameter that reduces at a predetermined depth from the one end surface of the medal member, and a screw hole section including a female screw thread provided at the opposite end portion between the opposite end surface and the diameter reduction section. Preferably, the breaking groove is placed at a predetermined position closer to the one end surface than the portion in which the diameter reduction section is formed.

In this structure, the breaking groove is placed at one end portion between one end surface and the diameter reduction section of the first attachment hole with a closed-end bottom. This structure makes a female screw thread of the screw hole section not to be broken at breaking in the breaking groove.

The connecting nut described above further includes a cap member set in the first attachment hole to close the first attachment hole. Preferably, the cap member is removed from the metal member together with the one end portion between the one end surface and the breaking groove of the metal member at the time of breaking in the breaking groove.

The cap member described above preferably includes a wall section contacted by an inner side surface of the attachment hole in the breaking groove.

The one end portion between the one end surface and the breaking groove of the metal member of the connecting nut described above is preferably formed as a tool attachment section for rotation control, and the opposite end portion between the breaking groove and the opposite end surface is formed as a cylindrical body portion.

The metal member has a through hole at a bottom portion and its vicinity at a predetermined depth in the first attachment hole from the one end surface. The through hole is communicatively coupled to the outer side surface of the metal member. A deformable material is provided in the bottom portion of the attachment hole and deforms in response to attachment of the bolt. The attachment of the bolt to the first attachment hole preferably causes a deformation in the deformable material and one part of the deformable material to project outside through the through hole.

Forth, the present invention is directed to an anchor including above-described connecting nut. According to one structure of the anchor of the present invention comprises: a shaft part with a male screw thread; a spreading sleeve including spreading parts formed at a tip portion of a tubular body that permits the shaft part to pass therethrough, the spreading parts being formed by a longitudinally cut slot in such a manner that the spreading parts spread outwardly; a cone nut having the outer diameter of which gradually reduces in the axial direction of the shaft part, the cone nut including a screw through hole defined therein to threadedly engage the male screw thread of the shaft part, the cone nut being attached to the shaft part with an edge of a smaller diameter of the cone nut engaging in a tip portion of the spreading sleeve; and a connecting nut formed by a metal member of a predetermined length in the axial direction that includes a first attachment hole at one end surface and a second attachment hole at an opposite end surface with a female screw thread to receive the shaft part therein, a bolt different from the shaft part being attached to the first attachment hole to connect in the axial direction. The connecting nut includes a breaking groove provided at an outer side surface of the metal member, the breaking groove being placed at a predetermined position at an outer surface of a portion in which the first attachment hole is defined. The shaft part attached to the second attachment hole is caused to rotate in response to the rotation of one end portion between the one end surface and the breaking groove of the connecting nut to drive the cone nut into the spreading sleeve, thereby causing the spreading parts to spread outwardly. Further, a torque equal to or greater than a fixed value exerted on the one end portion between the one end surface and the breaking groove of the connecting nut causes the breaking groove to be broken, thereby causing the one end portion between the one end surface and the breaking groove of the connecting nut to be removed.

According to the anchor of this structure, the connecting nut of aforementioned structure may be used. The anchor with the cap member set in the first attachment hole defined at the connecting nut may be used, for example.

Fifth, the present invention is directed to a clamping nut formed by a metal member of a predetermined length in the axial direction that includes a circular hole having an inner diameter of a predetermined length at one end surface and a screw hole with a female screw thread at an opposite end surface, and causes a bolt to attach to the screw hole to clamp. According to one structure of the clamping nut includes a breaking groove provided at an outer side surface of the metal member. The breaking groove is placed at a predetermined position at an outer surface of a portion in which the circular hole is defined. A torque equal to or greater than a fixed value exerted on one end portion between the one end surface and the breaking groove causes the breaking groove to be broken, thereby causing the one end portion between the one end surface and the breaking groove of the metal member to be removed.

The clamping nut described above further includes a cap member set in the circular hole. The cap member includes a wall section contacted by an inner side surface of the circular hole in the breaking groove. The breaking in the breaking groove preferably causes the cap member to be removed from the metal member together with the one end portion between the one end surface and the breaking groove. In this structure, the wall section of the cap member presses the broken portion from inside when the breaking groove is broken. This structure prevents unnecessary breaking projection to be created.

Sixth, the present invention is directed to an anchor including above-described clamping nut. According to one structure of the anchor comprises: a shaft part with a male screw thread; a spreading sleeve including spreading parts formed at a tip portion of a tubular body that permits the shaft part to pass therethrough, the spreading parts being formed by a longitudinally cut slot in such a manner that the spreading parts spread outwardly; a cone nut having the outer diameter of which gradually reduces in the axial direction of the shaft part, the cone nut including a screw through hole defined therein to threadedly engage the male screw thread of the shaft part, the cone nut being attached to the shaft part with an edge of a smaller diameter of the cone nut engaging in a tip portion of the spreading sleeve; and a clumping nut formed by a metal member of a predetermined length in the axial direction that has a circular hole having an inner diameter of a predetermined length at one end surface and a screw hole with a female screw thread to receive the shaft part therein at an opposite end surface. The clumping nut includes a breaking groove provided at an outer side surface of the metal member, the breaking groove being placed at a predetermined position at an outer surface of a portion in which the circular hole is defined. The shaft part attached to the screw hole is caused to rotate in response to the rotation of one end portion between the one end surface and the breaking groove of the clumping nut to drive the cone nut into the spreading sleeve, thereby causing the spreading parts to spread outwardly. Further, a torque equal to or greater than a fixed value exerted on the one end portion between the one end surface and the breaking groove of the clumping nut causes the breaking groove to be broken, thereby causing the one end portion between the one end of the clumping nut and the breaking groove of the clumping nut to be removed.

According to the anchor of this structure, the clamping nut of aforementioned structure may be used. The anchor with the cap member set in the circular hole defined at the clamping nut may be used, for example.

The present invention makes it possible to check the placement condition of the anchor by visually checking whether or not the breaking groove is broken to realize efficient and safe check after the placement.

BRIEF DESCRIPTION OF THE DRAWINGS

FIGS. 25A and 25B show an exemplary structure of the anchor bolt having a shaft part and the head part provided separately.

DESCRIPTION OF THE PREFERRED EMBODIMENTS

Figure 1:
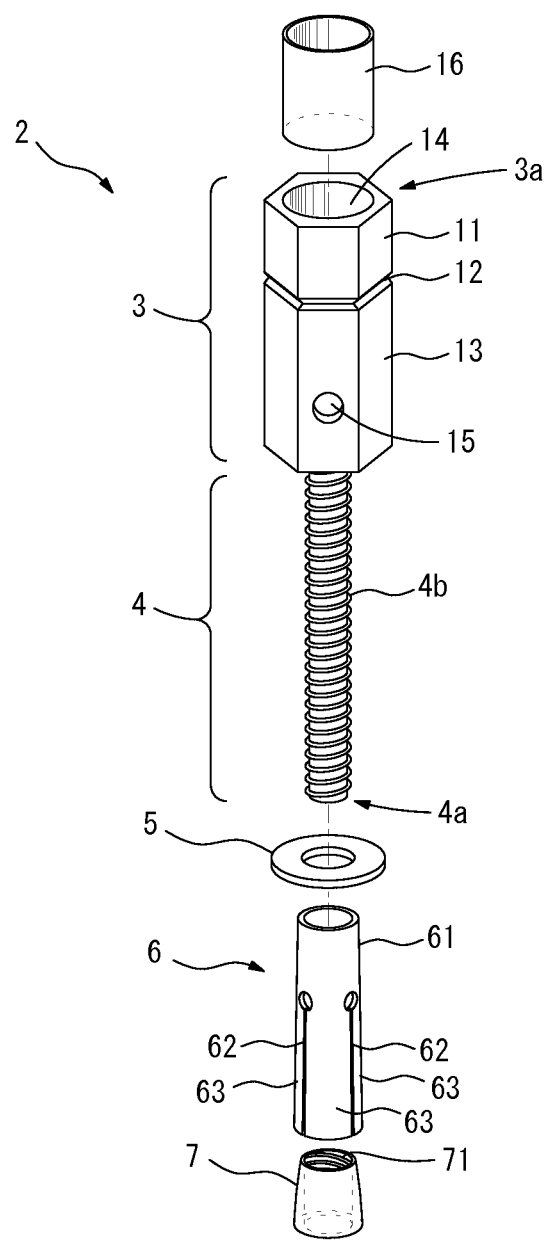
FIG. 1 is a perspective view of an anchor of a first preferred embodiment of with all parts of the anchor separated.

Preferred embodiments of the present invention are described in detail below with reference to figures. In the description given below, those elements which are shared in common among the preferred embodiments are represented by the same reference numerals, and these elements are not discussed repeatedly for the same description.

First Preferred Embodiment

Figure 2:
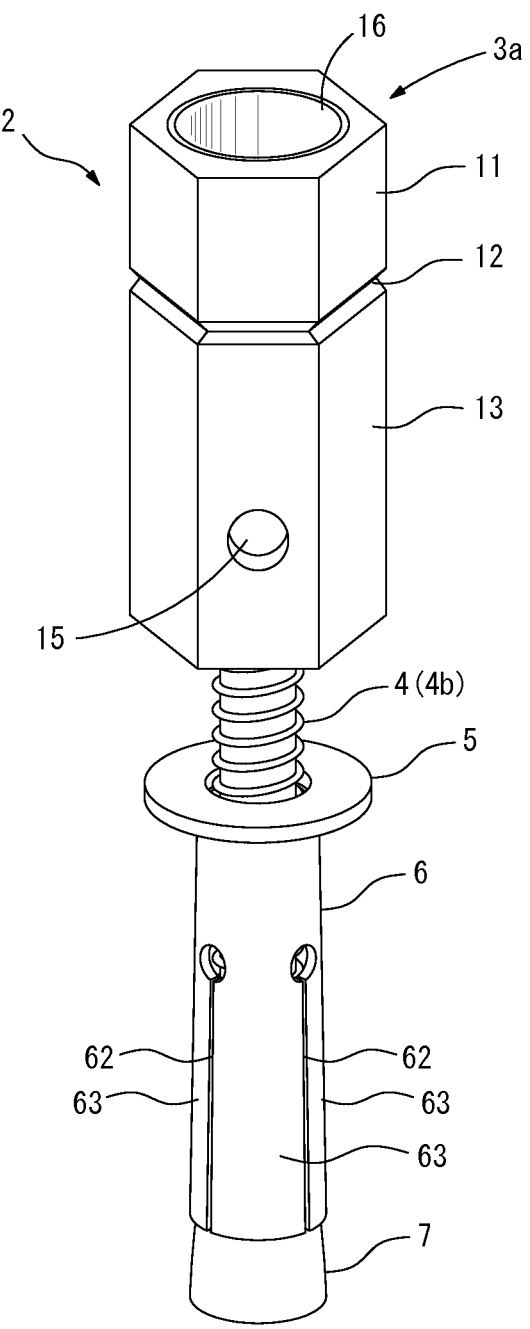
FIG. 2 is a perspective view of the anchor of the first preferred embodiment with all the parts of the anchor assembled.
Figure 3:
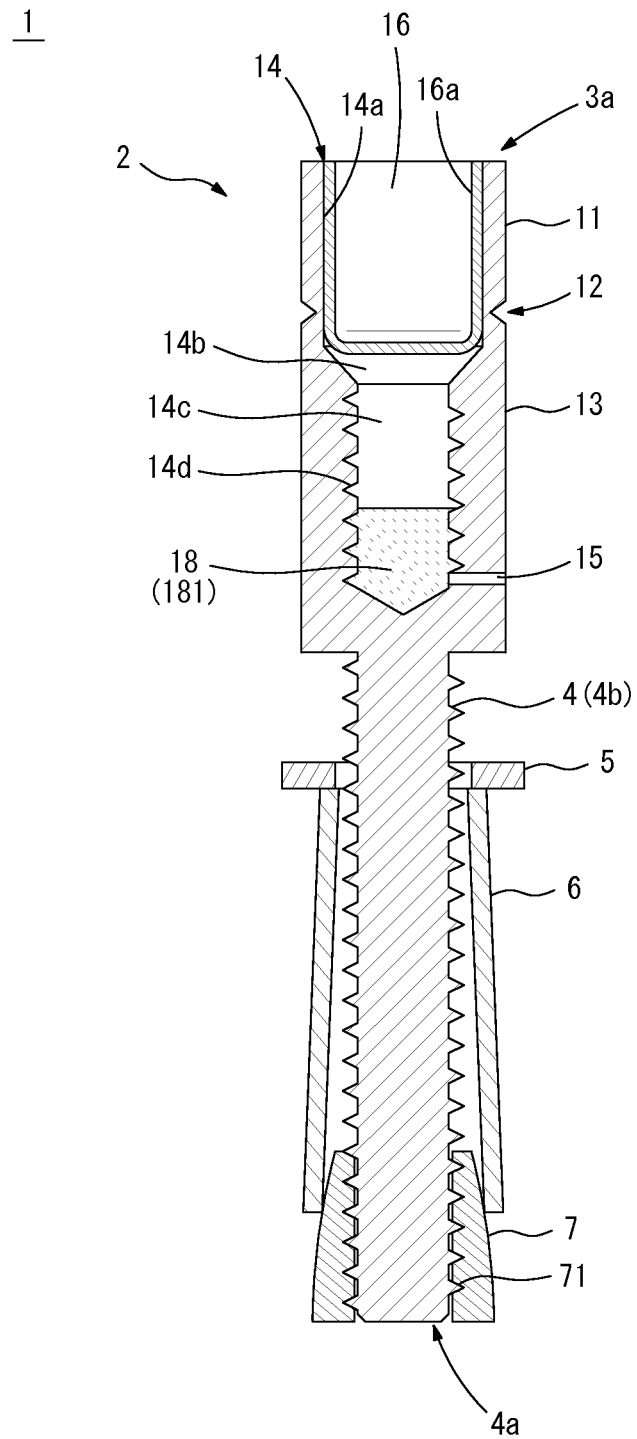
FIG. 3 is a longitudinal sectional view of the anchor the first preferred embodiment with all the parts of the anchor assembled.

FIG. 1 is a perspective view of an anchor 1 of a first preferred embodiment of the present invention with all parts of the anchor 1 separated. FIG. 2 is a perspective view of the anchor 1 with all the parts of the anchor 1 assembled. FIG. 3 is a longitudinal sectional view of the anchor 1 with all the parts of the anchor 1 assembled.

The anchor 1 of the first preferred embodiment includes an anchor bolt 2, a washer 5, a spreading sleeve 6, a cone nut 7 and a cap member 16 as illustrated in FIG. 1. The anchor 1 is to be attached and fixed to various types of skeletons such as concrete buildings and structures, and is also suited for attachment to any of ceiling structures or surfaces of walls or floors.

The anchor bolt 2 includes a shaft part 4 of a predetermined length with a male screw thread 4b and a head part 3 connected to one end of the shaft part 4. The head part 3 and the shaft part 4 are, for example, formed integrally, and have the same axial center. The outer diameter of the head part 3 is larger than that of the shaft part 4. The head part 3 has a predetermined length in the axial direction. An attachment hole 14 having a closed-end bottom is defined at a tip surface 3a of the head part 3 to receive therein another bolt after placement and fixation of the anchor 1 are complete. The cap member 16 is attached to the attachment hole 14 to close the attachment hole 14 to prevent receipt of the bolt in incompletion of the placement of the anchor 1. The cap member 16 may be made of metal or even cured resin. The cap member 16 is preferred to be colored for example in red or yellow to be seen from a long distance.

An outer side surface of the head part 3 is given a ring-shaped breaking groove 12 at a predetermined length from the tip surface 3a of the head part 3. The head part 3 includes a tip portion between the tip surface 3a and the breaking groove 12 formed as a tool attachment section 11 which is gripped by a tool such as a torque wrench to rotate. A portion of the head part 3 between the shaft part 4 and the breaking groove 12 is formed as a body portion 13 for holding a bolt to be attached later. Each of FIGS. 2 and 3 shows an example of the tool attachment section 11 and the body portion 13 in a hexagonal shape.

As shown in FIG. 3, the inner diameter from the opening at the tip portion of the attachment hole 14 defined at the tip surface 3a of the head part 3 to a position at a depth of a predetermined length is formed to have a certain length, and forms a tubular large bore section 14a, the inner side surface of which is flat. The attachment hole 14 has a tapered-shaped diameter reduction section 14b connected to an end of the large bore section 14a. The tapered-shaped diameter reduction section 14b has an inner diameter gradually reduced toward the side of its bottom portion. The attachment hole 14 has a bottom hole defined in the bottom portion between an end of the diameter reduction section 14b and the bottom surface. The length of the inner diameter of the bottom hole is the same as that reduced at the diameter reduction section 14b. A closed-end screw hole section 14c with a female screw thread 14d is defined in the bottom hole between the diameter reduction section 14b and the closed bottom end. The breaking groove 12 provided at the outer side surface of the head part 3 is placed closer to the tip surface 3a of the head part 3 than the diameter reduction section 14b of the attachment hole 14 as shown in FIG. 3. To be more specific, the breaking groove 12 is provided at the outer side surface of a portion at which the large bore section 14a is formed. The thickness of the portion with the breaking groove 12 is smaller than other portions of the head part 3. In the first preferred embodiment, by appropriately changing the thickness of the portion with the breaking groove 12, the head part 3 is caused to be broken through the breaking groove 12 when a torque equal to or greater than a fixed value is exerted on the tool attachment section 11 placed at the tip surface 3a of the head part 3. The torque required for breaking in the head part 3 through the breaking groove 12 may be appropriately set by adjusting the depth of the breaking groove 12.

The cap member 16 set in the attachment hole 14 includes a wall section 16a contacted by the inner side surface of the large bore section 14a extended to inside of the breaking groove 12 as illustrated in FIG. 3. The wall section 16a contacted by the inner side surface of the large bore section 14a prevents the cap member 16 from falling from the attachment hole 14 and contributes to no breaking projections (burrs) projecting into the attachment hole 14 after breaking in the head part 3 through the portion with the breaking groove 12. The cap member 16 also serves as a dustproof cap to close off the screw hole section 14c with the female screw thread 14d.

The screw hole section 14c defined at the deepest of the attachment hole 14 receives a connecting bolt threadedly attached thereto. A through hole 15 communicatively coupled to the outer side surface of the head part 3 is defined in the bottom portion and its vicinity of the screw hole section 14c. The bottom portion of the screw hole section 14c is provided with a deformable material 18 that deforms in response to threadedly attachment of the connecting bolt. The deformable material 18 is formed by a flexible material 181 that has flexibility in the example of FIG. 3. The flexible material 181 of FIG. 3 is made of oil-based clay colored in a certain color such as red. The oil-based clay functions as a rust inhibitor for its oiliness, thereby suppressing deterioration of the bolt attached to the screw hole section 14c. The color of the flexible material 181 is preferred to be something different from the one of the above-described cap member 16.

The washer 5, the spreading sleeve 6 and the cone nut 7 are inserted and attached in this order to the shaft part 4 of the anchor bolt 2 of the aforementioned structure from a tip portion 4a of the shaft part 4, thereby forming the anchor 1.

The spreading sleeve 6 is a tubular body 61 to receive the shaft part 4 of the anchor bolt 2 therein. The shape of the spreading sleeve 6 is such that multiple longitudinally cut slots 62 are provided at a tip portion of the tubular body 61, and that sections defined by the multiple longitudinally cut slots 62 form spreading parts 63 that spread outwardly. The spreading parts 63 of the first preferred embodiment have a smooth side surface, to which the present invention is not intended to be limited. The outer side surface of the spreading parts 63 may be given one or multiple ribs extending in the circumferential direction. The number of the spreading parts 63 provided at the tip portion of the spreading sleeve 6 is generally three or four. Or, five or more spreading parts may be provided. The spreading sleeve 6 of the aforementioned structure is attached to the shaft part 4 such that the tip portion of the spreading sleeve 6 at which the spreading parts 63 are formed is directed toward the tip portion 4a of the shaft part 4 of the anchor bolt 2.

The cone nut 7 is attached to the tip portion 4a of the shaft part 4. The outer shape of the cone nut 7 is a truncated cone the outer diameter of which gradually reduces in the axial direction, and the circumferential side surface of the cone nut 7 forms a smoothly tapered surface. A screw through hole 71 to threadedly engage the male screw thread 4b formed at the shaft part 4 is defined in the inner central part of the cone nut 7. The cone nut 7 is attached to the tip portion 4a of the shaft part 4 with the edge of a smaller diameter of the cone nut 7 engaging in the tip portion of the spreading sleeve 6. The larger diameter of the cone nut 7 sticks out beyond the tip portion of the spreading sleeve 6 for the attachment.

Figure 4:
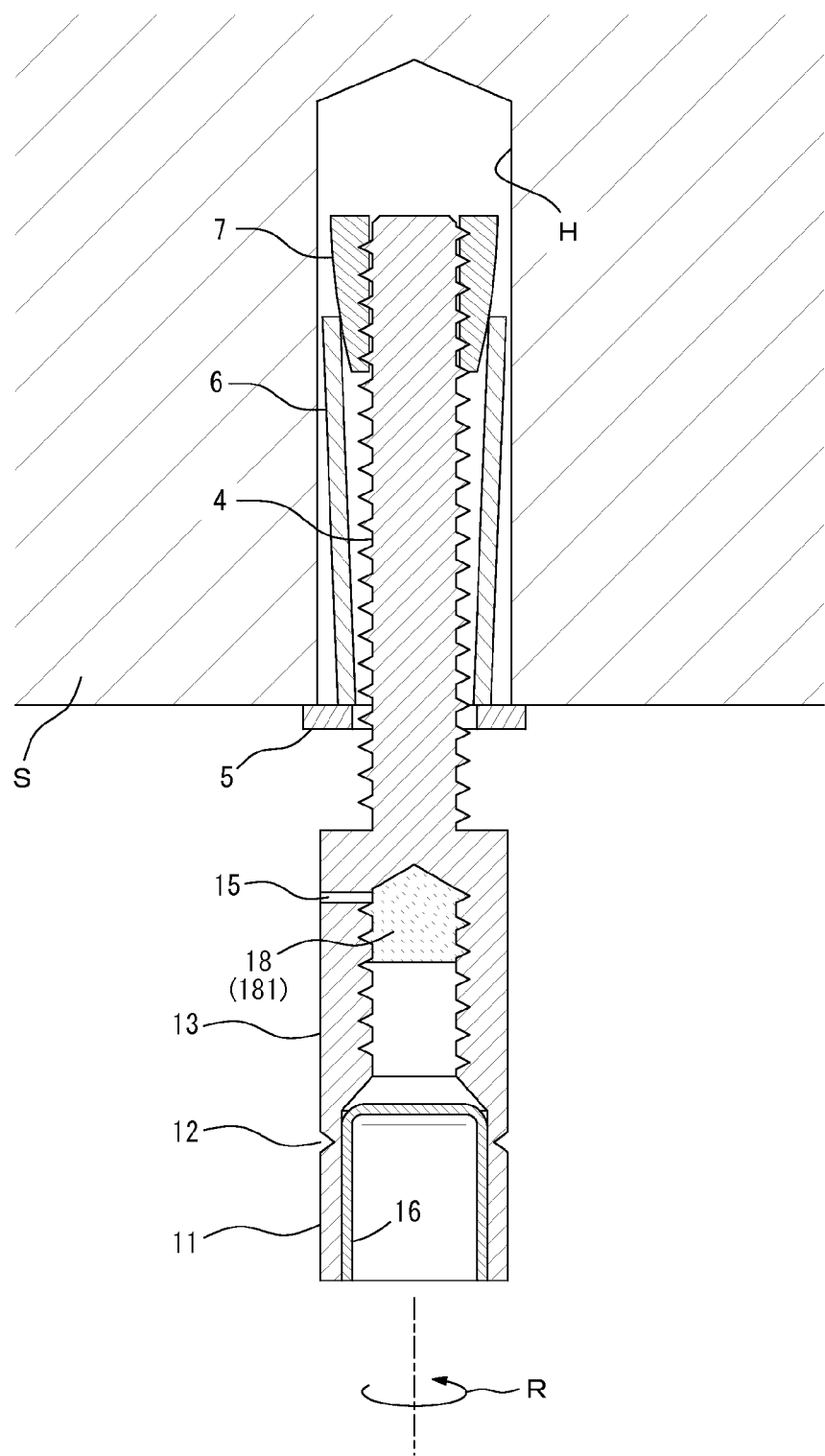
FIG. 4 shows an example of a first step of a process of placing the anchor of the first preferred embodiment.
Figure 5:
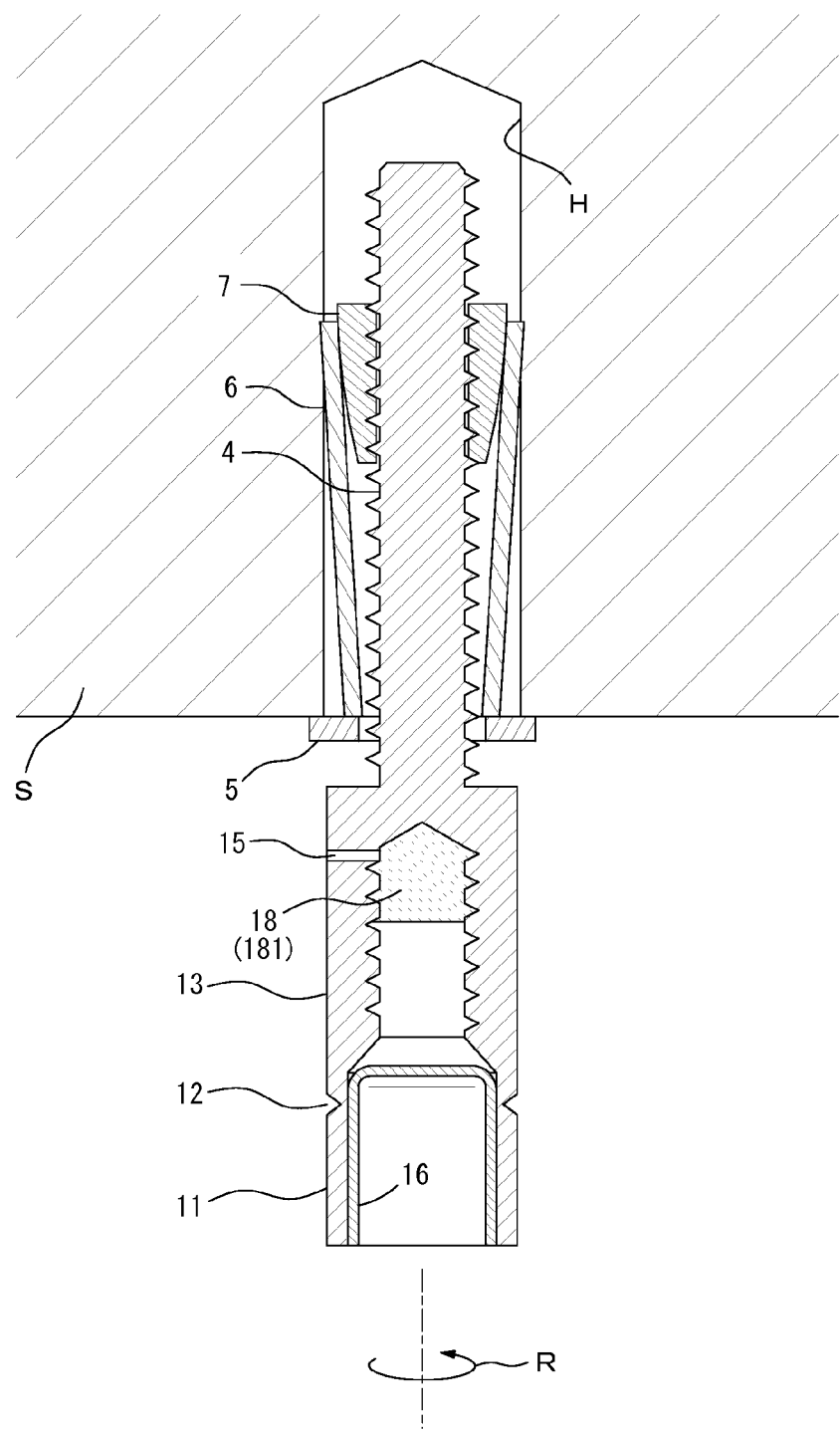
FIG. 5 shows an example of a second step of the process of placing the anchor of the first preferred embodiment.
Figure 6:
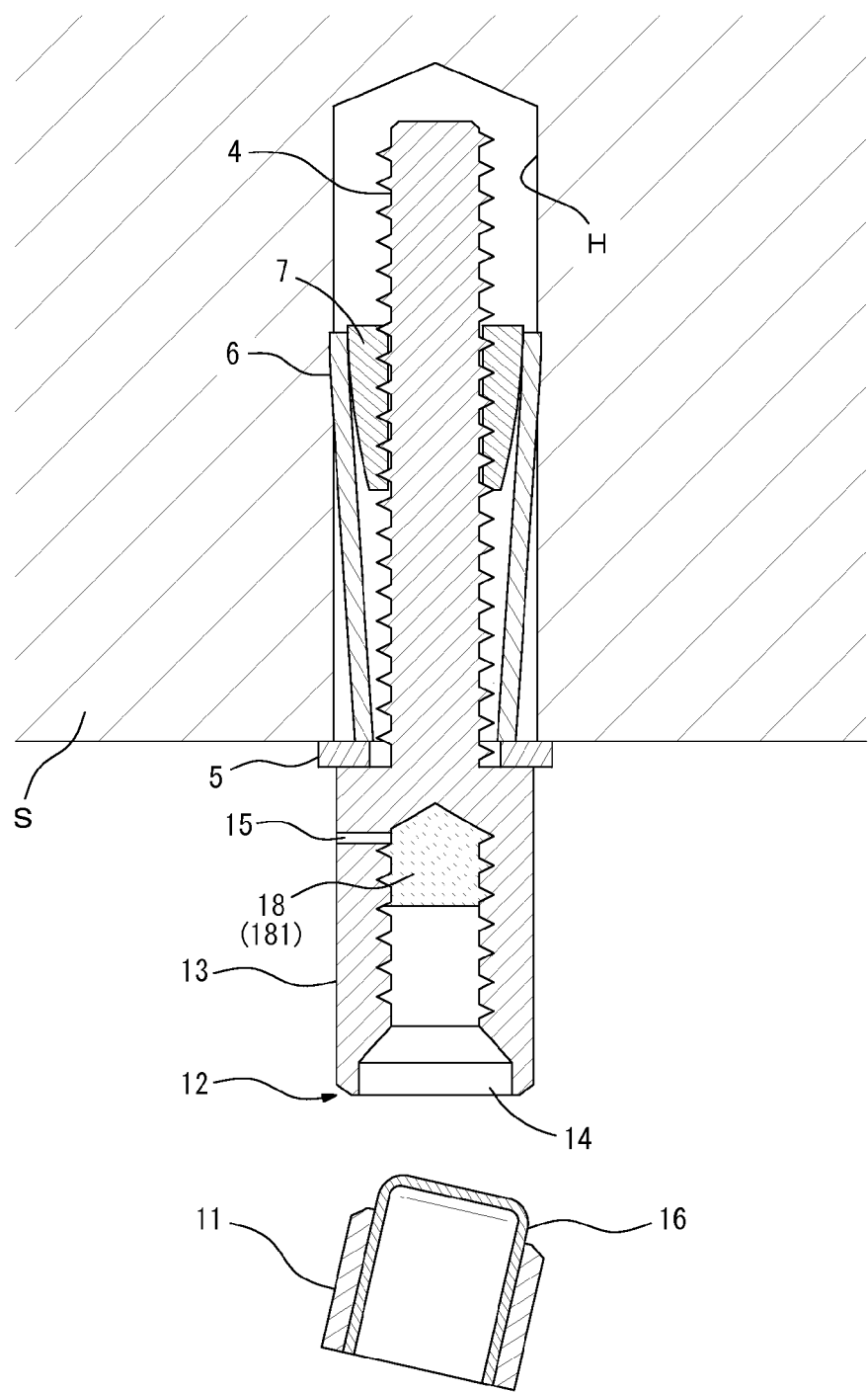
FIG. 6 shows an example of a third step of the process of placing the anchor of the first preferred embodiment.

Placement of the anchor 1 of the first preferred embodiment is described next. FIGS. 4, 5 and 6 show an exemplary flow of placement of the anchor 1. First, as shown in FIG. 4, the tip portion of the shaft part 4 of the anchor 1 of the aforementioned structure is inserted into a hole H defined in a skeleton S such as a ceiling structure. The diameter of the hole H is substantially the same as or a little greater than that of the spreading sleeve 6. The depth of the hole H is substantially the same as or greater than the length of the shaft part 4 of the anchor bolt 2. Insertion of the tip portion of the shaft part 4 of the anchor 1 into the hole H makes the circumferential side surface of the spreading sleeve 6 contact with the inner wall of the hole H to generate friction therebetween. So, the lower surface of the head part 3 of the anchor bolt 2 is struck with a hammer and the like to drive the anchor 1 into the hole H, if necessary. Then, the substantially entire part of the spreading sleeve 6 is placed inside the hole H as shown in FIG. 4.

After the tip portion of the anchor 1 is inserted into the hole H as shown in FIG. 4, a tool such as a torque wrench is attached to the tool attachment section 11 formed at the head part 3 of the anchor bolt 2, so the head part 3 of the anchor bolt 2 is caused to rotate in a direction indicated by an arrow R in FIG. 4. At this time, a worker may conduct his operation to cause the head part 3 of the anchor bolt 2 to rotate at a floor by using an extension tool.

The rotation at the head part 3 of the anchor bolt 2 causes the shaft part 4 to rotate, thereby driving the cone nut 7 into the spreading sleeve 6. To be specific, the condition of the cone nut 7 at this stage is such that the edge of a smaller diameter (lower end portion in the example of FIG. 4) of the cone nut 7 engages in the tip portion of the spreading sleeve 6. Further, the spreading sleeve 6 is prevented from rotating as it is in contact with the inner wall of the hole H. So, the rotation of the shaft part 4 does not cause the cone nut 7 to rotate, but which drives the cone nut 7 further from the tip portion of the spreading sleeve 6 into the spreading sleeve 6. As a result, the cone nut 7 makes the spreading parts 63 of the spreading sleeve 6 spread outwardly as shown in FIG. 5. At this time, the spreading parts 63 of the spreading sleeve 6 spread outwardly in a radius direction such that they press the inner wall of the hole H, thereby fixing the anchor 1 to the hole H. The rotation of the head part 3 of the anchor bolt 2 causes the shaft part 4 to be threadedly driven deeper into the hole H.

The tool attached to the tool attachment section 11 of the head part 3 is controlled to cause the head part 3 to rotate, so the anchor bolt 2 stops being threadedly driven deeper into the hole H. Then, the rotation at the shaft part 4 with the rotation at the head part 3 causes the cone nut 7 to drive into the spreading sleeve 6. At this time, the spreading parts 63 of the spreading sleeve 6 are caused to spread outwardly. As the anchor 1 is fixed to the hole H at the sufficient intensity, a torque reaches the fixed value to rotate the tool attachment section 11. The torque equal to or greater than the fixed value is exerted on the tool attachment section 11, so that the head part 3 of the anchor bolt 2 is broken through a portion the breaking groove 12 is provided as shown in FIG. 6. As a result, the tool attachment section 11 and the cap member 16 are separated from the head part 3. By attaching the tool to the tool attachment section 11 to place the anchor bolt 2 and causing the head part 3 of the anchor bolt 2 to break through the breaking groove 12, the anchor 1 is favorably fixed to the skeleton S and the placement is complete.

When the value of the clamping torque does not satisfy a predetermined minimum of the range, this type of the anchor 1 may not ensure the sufficient intensity due to insufficient clamping, resulting in faulty placement. Also, the value of the clamping torque exceeding the predetermined maximum of the range results in faulty placement due to the overtightening. To be more specific, the minimum of the range and the maximum of the range of the clamping torque are set in order for the anchor 1 to be fixed at the sufficient intensity. In the first preferred embodiment, the breaking groove 12 is provided such that the head part 3 is caused to break when the torque of the value intermediate between the minimum of the range and the maximum of the range is exerted on the tool attachment section 11. If the breaking torque value is different from a designated value, the breaking torque value may be within the range of the minimum of the range and the maximum of the range. As a result, the insufficient clamping and overtightening are effectively avoided and the anchor 1 is favorably fixed to the skeleton S.

The breaking in the head part 3 as described above causes the tool attachment section 11 and the cap member 16 to separate together from the head part 3. In the first preferred embodiment, a broken part consisted of the tool attachment section 11 and the cap member 16 separated from the head part 3 is collected by the worker, so the placement of the anchor 1 may be managed. To be more specific, for example, a field supervisor collects the broken parts having the tool attachment section 11 and the cap member 16 from the worker and checks if the number of the anchor 1 placed on the ceiling structure and the number of the collected parts are the same. If the numbers are the same, it is determined that all the anchors 1 are favorably placed on the ceiling structure. If the numbers are not the same, it is determined that the placement of one or more anchors 1 is not complete. In this case, one or more anchor 1 inserted into the ceiling structure includes the head part 3 of the anchor bolt 2 with which the tool attachment section 11 and the cap member 16 still remain. The field supervisor visually checks to see the ceiling structure from the floor if there is the anchor 1 with the cap member 16, thereby specifying the anchor 1 the placement of which is incomplete. At this time, by using the cap member 16 colored in a certain color such as red or yellow, the field supervisor can visually see the anchor 1 the placement of which is incomplete from a position relatively far from the anchor 1. This makes check of the placement condition of the anchor 1 easy, thereby enhancing working efficiency. Therefore, the placement condition of the anchor 1 of the first preferred embodiment may be checked easily. Also, this check does not require climbing up to the height of the ceiling structure, thereby providing safety in the check.

As the head part 3 is broken as described above, some breaking projections (burrs) are created on the broken area. The wall section 16a of the cap member 16, however, prevents such breaking projections to project into the attachment hole 14. In response to separation of the tool attachment section 11 and the cap member 16 from the head part 3, the attachment hole 14 is favorably opened in order for the connecting bolt to attach.

The anchor 1 with the unbroken head part 3 is determined such that it is not fixed to the skeleton S at the sufficient intensity. In this state, the cap member 16 closes the attachment hole 14, so the attachment hole 14 may be prevented from being attached by the connecting bolt.

Figure 7:
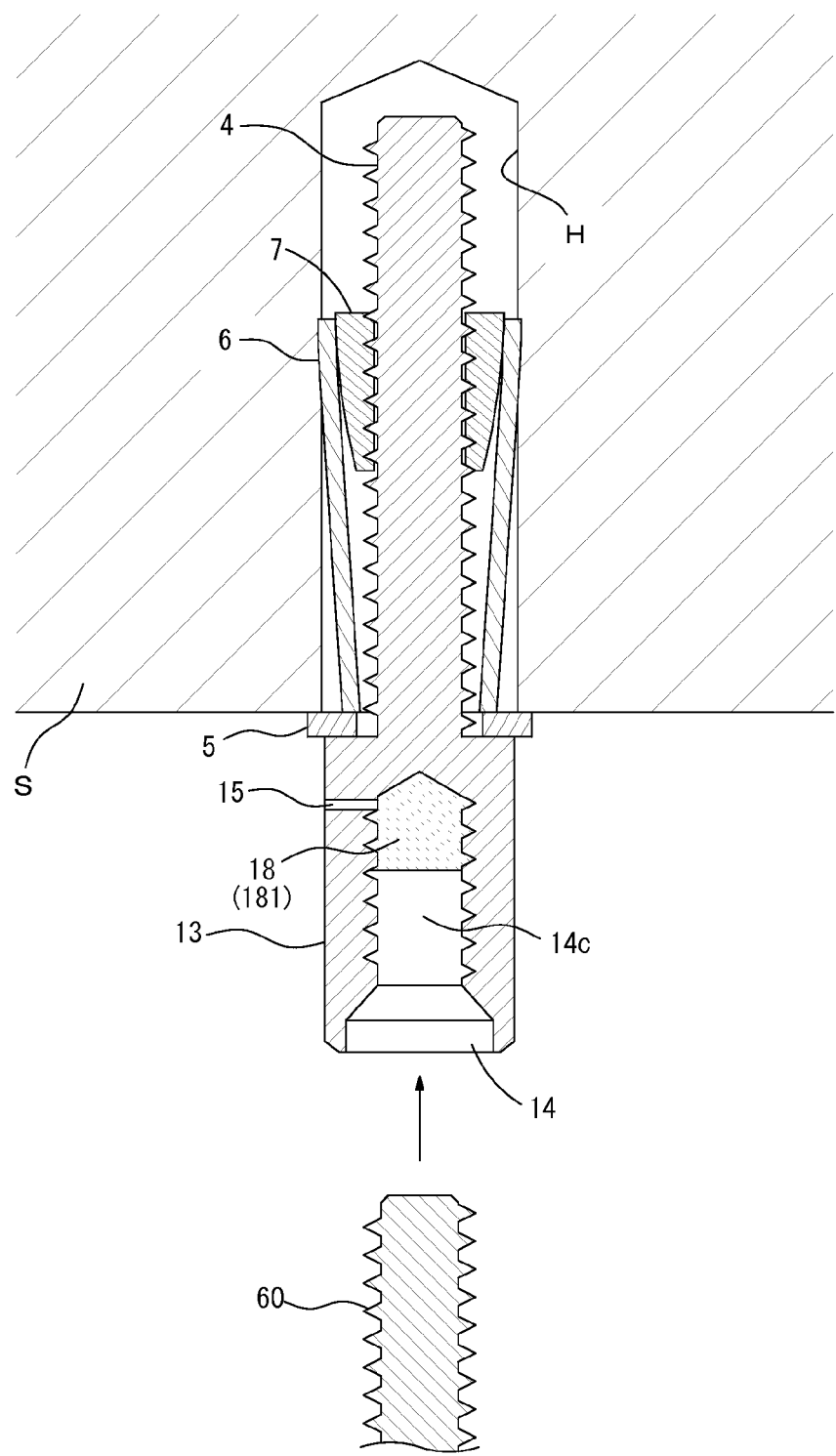
FIG. 7 shows an example of a first step of a process of attaching a connecting bolt to the anchor.
Figure 8:
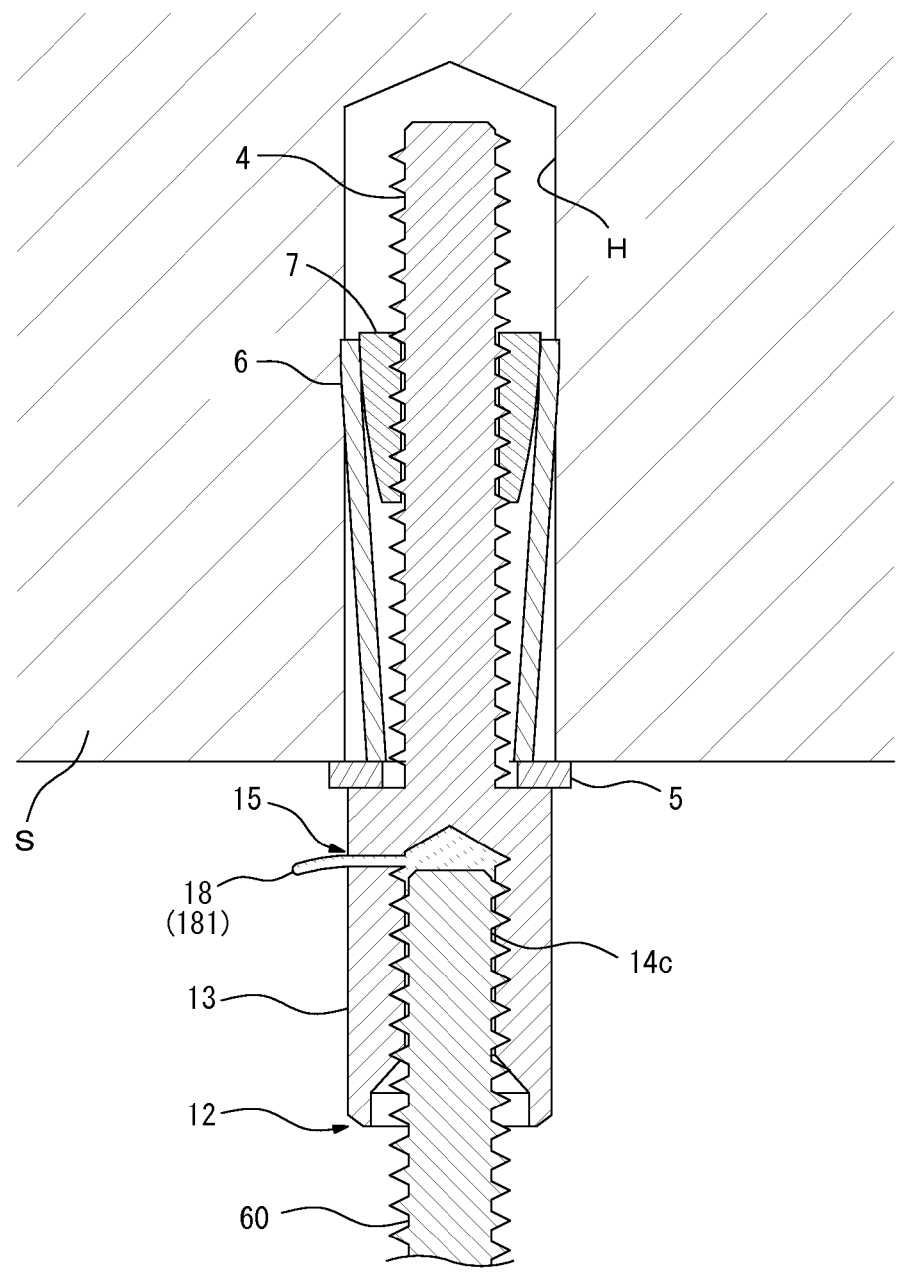
FIG. 8 shows an example of a second step of the process of attaching the connecting bolt to the anchor.

It is described next how a connecting bolt 60 that may be a hanger bolt or a joint bolt is attached to the anchor 1 thereby fixed to the skeleton S. FIGS. 7 and 8 show an exemplary flow of attachment of the connecting bolt 60 to the anchor 1. As shown in FIG. 7, the connecting bolt 60 is inserted through the attachment hole 14 opens in a direction toward the end surface (lower surface) of the broken head part 3 of the anchor bolt 2 and attached to the screw hole section 14c defined at the inner portion of the attachment hole 14. The bolt 60 is suspended from the skeleton S through the anchor 1. So, the bolt 60 should be inserted for attachment to reach the bottom portion of the screw hole section 14c. The depth of insertion of the bolt 60 into the screw hole section 14c smaller than a certain depth results in faulty placement.

As described above, in the example of FIGS. 7 and 8, the bottom portion of the closed-end screw hole section 14c is filled with the flexible material 181 as the deformable material 18 that is deformed in response to the attachment of the bolt 60. So, a tip portion of the bolt 60 presses the flexible material 181 as the bolt 60 is threadedly driven into the screw hole section 14c. The flexible material 181 is deformed in response to pressing force applied from the bolt 60, and which then enters into the through hole 15 communicatively coupled to the outer side surface of the head part 3. As the bolt 60 is driven deeper into the screw hole section 14c, the flexible material 181 is caused to pass through the through hole 15 to go outside through the side surface of the head part 3 as shown in FIG. 8. The placement is complete when the bolt 60 reaches the bottom portion of the screw hole section 14c. At this time, the flexible material 181 going outside through the side surface of the head part 3 indicates that the bolt 60 has been placed favorably.

So, when the anchor 1 of the first preferred embodiment is placed on the ceiling structure, and the bolt 60 is attached to the anchor 1 in this state, the placement condition of the anchor 1 and the attachment condition of the bolt 60 can be checked at the same time. To be specific, a worker or a field supervisor visually checks to see from a floor if the flexible material 181 goes outside through the side surface of the head part 3 of the anchor 1. Thus, the attachment condition of the bolt 60 can be checked, resulting in further enhanced working efficiency. A worker responsible for attachment of the bolt 60 is also allowed to know the completion of the placement by checking to see if the flexible material 181 goes outside through the side surface of the head part 3.

As described above, the flexible material 181 such as oil-based clay colored for example in red is used as the deformable material 18. This specific feature makes it possible to easily determine if the flexible material 181 goes outside through the side surface of the head part 3 of the anchor bolt 2. To be specific, if the flexible material 181 is made of an argillaceous material, the flexible material 181 appearing on the side surface of the head part 3 keeps sticking to the side surface of the head part 3 without dropping to a floor, so that the attachment condition of the bolt 60 can easily be checked individually. Also, if the flexible material 181 made of oil-based clay is used, the flexible material 181 functions as a rust inhibitor as described above, thereby suppressing deterioration of the bolt 60.

The above-described deformable material 18 is not intended to be limited to the flexible material 181 such as oil-based clay. The deformable material 18 may be made of a component as described later.

Figure 9:
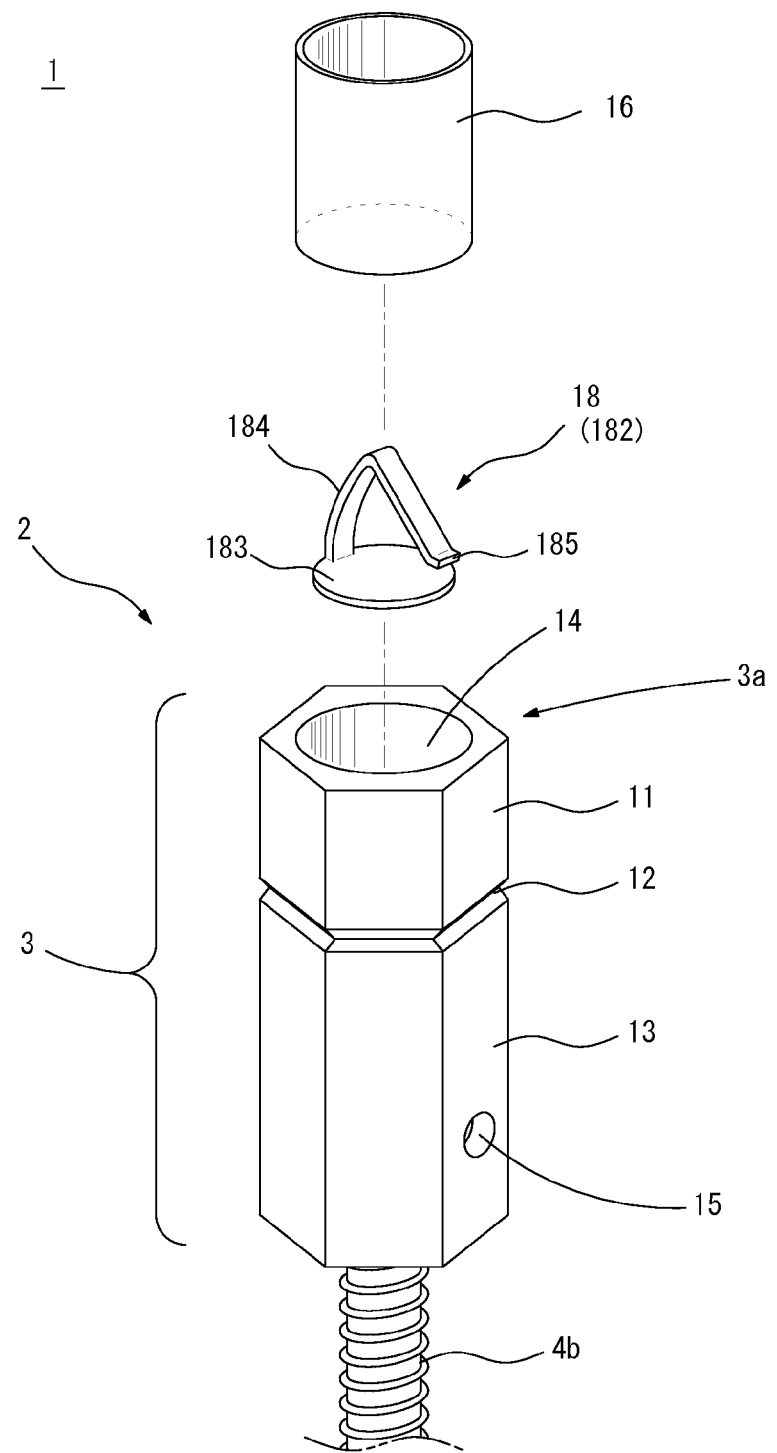
FIG. 9 is a perspective view showing an enlarged view of a head part of an anchor bolt.

FIG. 9 is a perspective view showing an enlarged view of the head part 3 of the anchor bolt 2 of the first preferred embodiment. In the example of FIG. 9, a component 182 made of a shaped resin which has flexibility such as polypropylene is inserted for attachment in the bottom portion of the attachment hole 14 as the deformable material 18 that is deformed in response to the attachment of the bolt 60.

The component 182 includes a disk-shaped attachment part 183 and a flexible part 184 supported by the attachment part 183 with being connected and standing at an edge of the attachment part 183. The attachment part 183 is formed to be the same as, or slightly smaller than the inner diameter of the screw hole section 14c defined in the inner portion of the attachment hole 14. The attachment part 183 is inserted through the opening portion at the attachment hole 14 defined at the tip surface 3a of the head part 3, thereby being attached to the bottom portion of the screw hole section 14c. One end of the flexible part 184 is fixed to the edge of the attachment part 183, and has its shape bended at the central part into the substantial V-shape. A tip portion 185 of opposite end of the flexible part 184 is formed in advance such that it projects outwardly with respect to the edge of the attachment part 183.

In response to insertion of the component 182 for attachment through the opening portion at the attachment hole 14 as shown in FIG. 9, the component 182 of this kind is inserted with the attachment part 183 being directed toward the bottom surface of the attachment hole 14. The flexible part 184 is compressed to form the slightly small bending angle and inserted. The attachment part 183 is inserted to reach the bottom surface of the attachment hole 14. As a result, the component 182 is attached. The tip portion 185 of the flexible part 184 is placed at a position, facing the through hole 15 communicatively coupled to the bottom portion and its vicinity of the screw hole section 14c. Then, the component 182 is attached to the bottom portion of the attachment hole 14, and the cap member 16 is set in the opening portion at the attachment hole 14.

Figure 10:
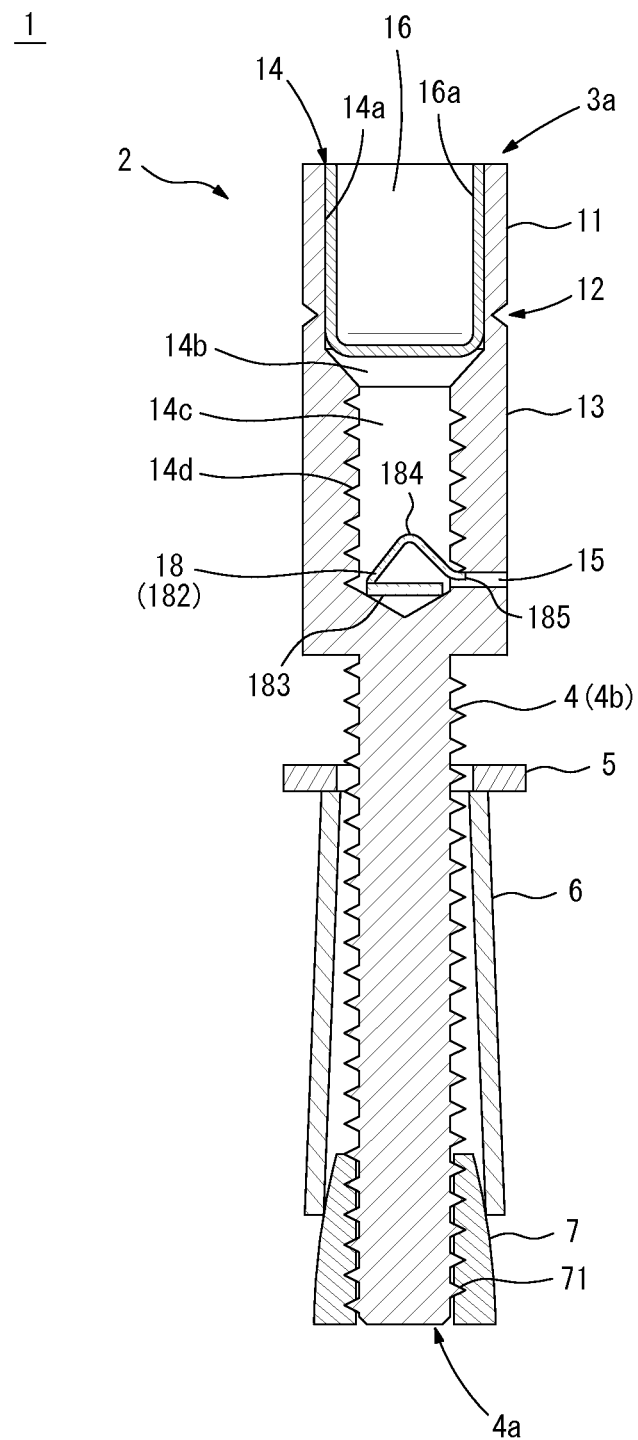
FIG. 10 is a sectional view of the anchor with a deformable component being attached to a bottom portion of an attachment hole.

FIG. 10 is a sectional view of the anchor 1 with the component 182 being attached to the bottom surface of the attachment hole 14. As described above, the tip portion 185 of the flexible part 184 is placed at a position at the bottom surface of the attachment hole 14 to face the through hole 15. As the component 182 is attached to the bottom surface of the attachment hole 14, some parts of the tip portion 185 of the flexible part 184 enter into the through hole 15 in the screw hole section 14c. The force to restore to the original substantial V-shape of the compressed flexible part 184 causes both ends of the flexible part 184 to press the inner wall of the screw hole section 14c. As a result, the component 182 is hold at the bottom portion of the screw hole section 14c, which prevents the component 182 from dropping off the screw hole section 14c.

Figure 11:
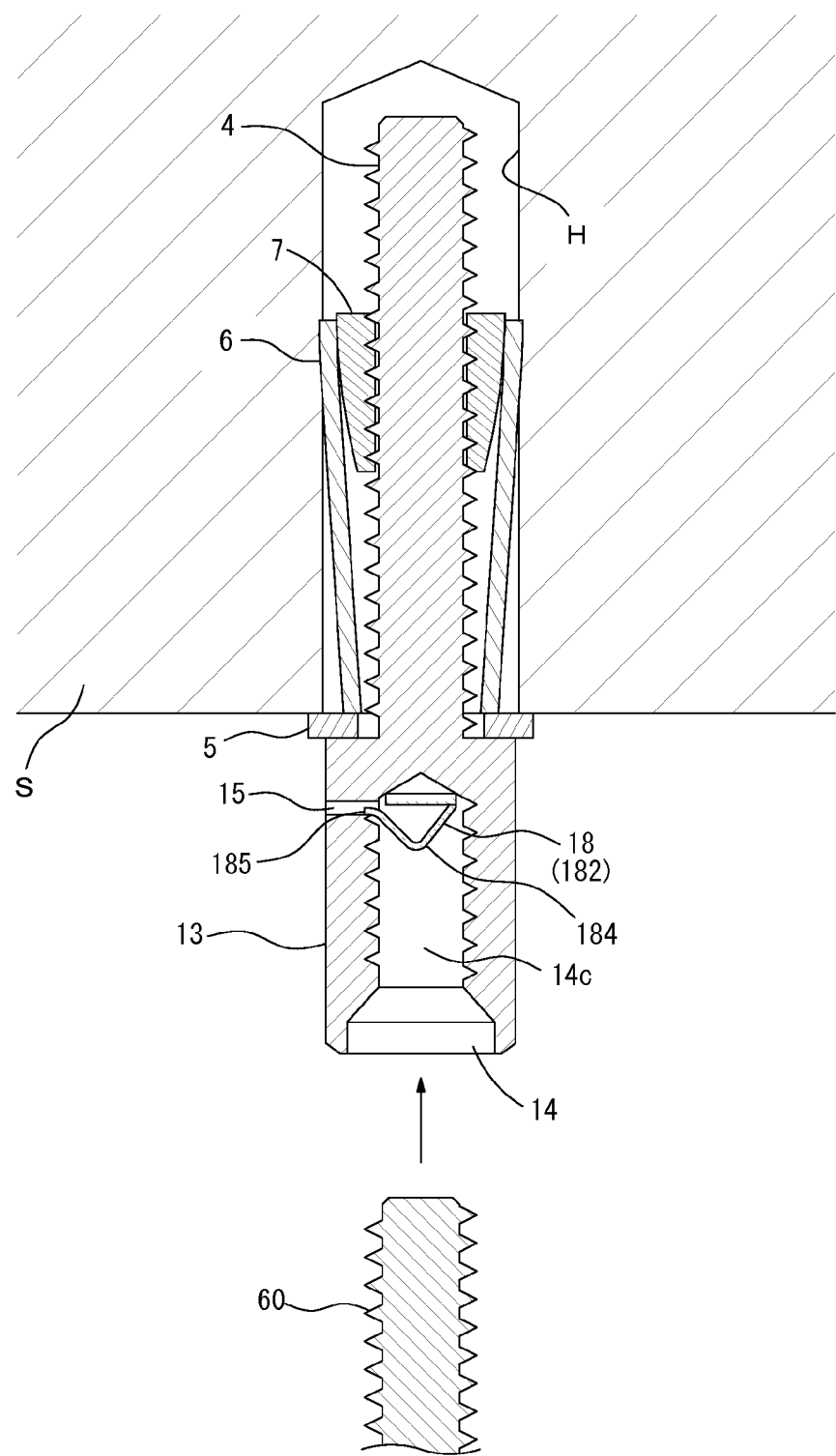
FIG. 11 shows an example of a first step of a process of attaching the connecting bolt to the anchor with the deformable component used as a deformable material.
Figure 12:
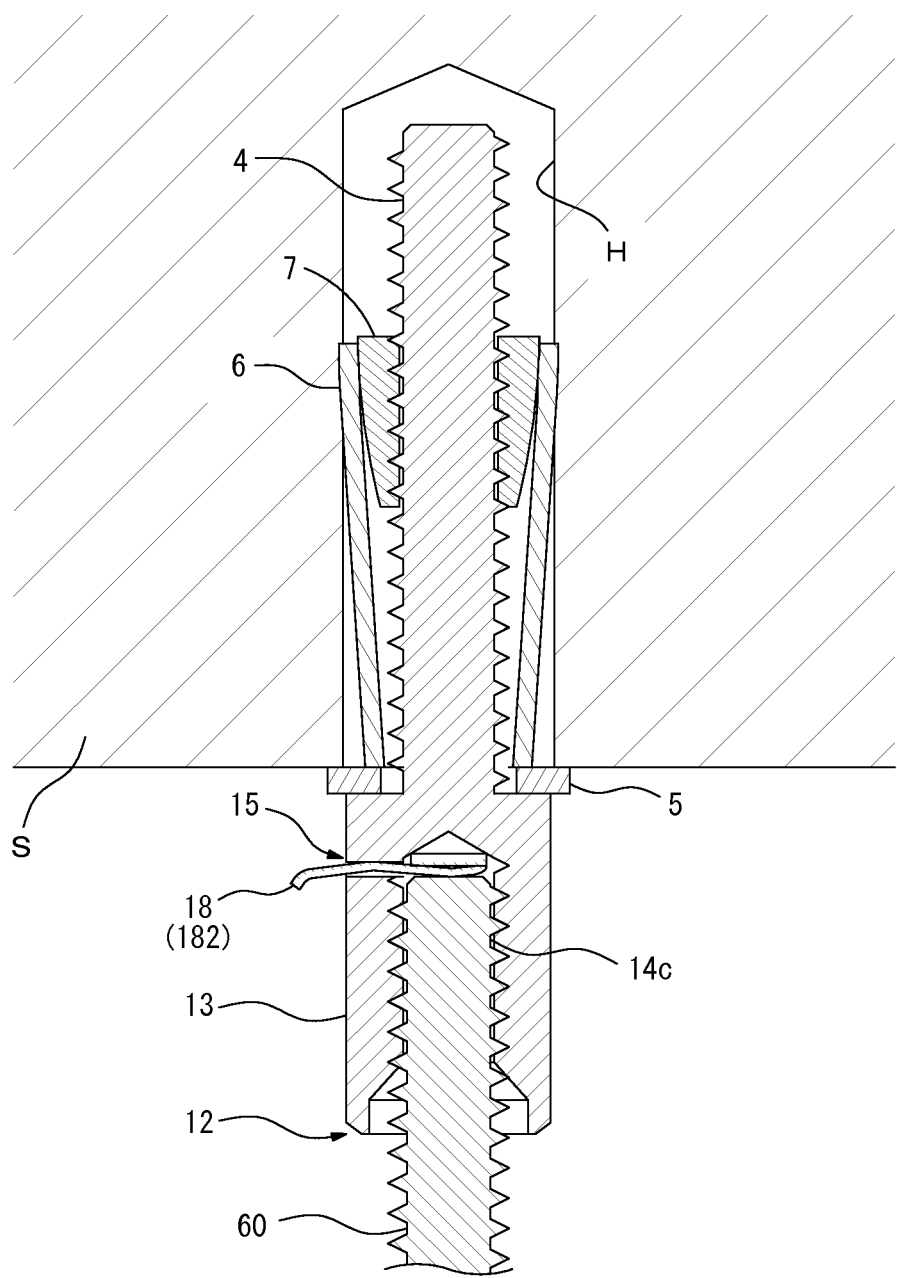
FIG. 12 shows an example of a second step of a process of attaching the connecting bolt to the anchor with the deformable component used as the deformable material.

FIGS. 11 and 12 show an example of a process of attachment of the connecting bolt 60 to the anchor 1 fixed to the skeleton S such as the ceiling structure. The process of the placement of the anchor 1 on the skeleton S is the same as that described above. The component 182 placed at the bottom portion of the screw hole section 14c is hold at the bottom portion of the screw hole section 14c as described above. So, the component 182 does not fall from the screw hole section 14c even when vibration has a direct impact on the anchor bolt 2 during the placement process, for example. Prior to attachment of the connecting bolt 60 to the attachment hole 14, the tip portion 185 of the flexible part 184 forming the component 182 is directed toward the through hole 15 at the inner side of the screw hole section 14c as shown in FIG. 11.

In response to the fixation of the anchor 1 on the skeleton S, the connecting bolt 60 is inserted for attachment into the attachment hole 14 defined at the head part 3 of the anchor bolt 2 as illustrated in FIG. 11. The tip potion of the connecting bolt 60 presses the portion bended into the substantial V-shape of the flexible part 184 as the connecting bolt 60 is threadedly driven into the screw hole section 14c. So, the flexible part 184 is gradually extended in response to pressing force applied from the connecting bolt 60. The tip portion 185 of the flexible part 184 further enters into the through hole 15 defined at the side surface of the head part 3.

As the connecting bolt 60 is driven deeper into the screw hole section 14c, the tip portion 185 of the flexible part 184 is caused to pass through the through hole 15 to go outside through the side surface of the head part 3 as shown in FIG. 12. The placement is complete when the connecting bolt 60 reaches the bottom surface of the screw hole section 14c. At this time, the tip portion 185 of the flexible part 184 going outside through the side surface of the head part 3 indicates that the bolt 60 has been placed favorably. When the bolt 60 is attached to the anchor 1 placed on the ceiling structure, the placement condition of the anchor 1 and the attachment condition of the connecting bolt 60 can be checked at the same time. These checks are enabled even in the state that the component 182 is used as the deformable material 18 as well as in the state that the flexible material 181 is used. For the component 182, the flexible part 184 is connected to the attachment part 183 attached to the bottom surface of the screw hole section 14c, resulting in prevention of the flexible part 184 being fallen from the side surface of the head part 3 after completion of placement of the connecting bolt 60.

When the deformable material 18 is formed by the flexible material 181 such as that made of oil-based clay like in the above described case, the flexible material 181 is caused to go outside through the side surface of the head part 3 in response to the completion of the placement of the connecting bolt 60. In such a case, some parts gone outside may be picked away by the worker due to his or her carelessness. If such situation occurs, it is not possible to check the condition of the connecting bolt 60 to see if it is placed favorably.

The component 182 is preferably used as the deformable material 18 provided with the bottom portion of the attachment hole 14 since it is formed not to fall from the side surface of the head part 3 even after attachment of the connecting bolt 60. So, the component 182 used as the deformable material 18 makes it possible to check the condition if the connecting bolt 60 is placed favorably, and that is always accurate. Preferably, the component 182 as described above is preferably colored in a certain color such as red, for example. The component 182 of this kind is not necessarily made of resin.

As described above, the anchor 1 of the first preferred embodiment includes the anchor bolt 2 including the shaft part 4 with the male screw thread 4b and the head part 3, the outer diameter of which is larger than that of the shaft part 4 connected to the base portion of the shaft part 4. The spreading sleeve 6 and the cone nut 7 are attached to the shaft part 4 of the anchor bolt 2. The head part 3 of the anchor bolt 2 is rotated to screw up with such the shaft part 4 being stuck in the hole H defined in the skeleton S. Then, the anchor 1 is fixed to the skeleton S. The cone nut 7 threadedly engages the shaft part 4 in this structure. So, the cone nut 7 does not fall off the spreading sleeve 6 even in occurrence of vibration, thereby firmly fixing to the ceiling structure.

The anchor bolt 2 of the first preferred embodiment includes the closed-end attachment hole 14 defined at the tip surface 3a of the head part 3 to receive the connecting bolt 60 therein. The cap member 16 is set in advance in the attachment hole 14 to close the attachment hole 14 and the ring-shaped breaking groove 12 is provided at an outer side surface of the head part 3. The breaking groove 12 is formed at a position which is a predetermined length away from the tip surface 3a of the head part 3. The breaking groove 12 is broken in response to a torque equal to or greater than the fixed value exerted on a tip portion between the tip surface 3a and the breaking groove 12 of the head part 3. This causes the tip portion between the tip surface 3a and the breaking groove 12 of the head part 3 to be removed with the cap member 16. With this structure, the cap member 16 set in the head part 3 of the anchor bolt 2 indicates that the anchor 1 has not been placed favorably, and further prevents the connecting bolt 60 being attached to the attachment hole 14 by mistake.

The closed-end attachment hole 14 defined at the tip surface 3a of the head part 3 of the anchor bolt 2 of the first preferred embodiment is provided with the diameter reduction section 14b the inner diameter of which reduces at the position at a depth of the predetermined value from the tip surface 3a. The screw hole section 14c with the female screw thread 14d is also defined at the bottom portion between the diameter reduction section 14b and the bottom surface. The breaking groove 12 provided at the outer side surface of the head part 3 is placed closer to outer side of the large bore section 14a at the tip portion than that of the diameter reduction section 14b of the attachment hole 14. So, the female screw thread 14d of the screw hole section 14c placed at the inner portion of the attachment hole 14 is prevented from being broken at time of the breaking in the head part 3 through the breaking groove 12. If the female screw thread 14d to receive the bolt 60 therein is placed inner side of the position the breaking groove 12 is provided, for example, the female screw thread 14d may be broken in response to the breaking in the head part 3 through the breaking groove 12. In such state, the bolt 60 may not attach. In the first preferred embodiment, the female screw thread 14d is not provided at the inner side of the position the breaking groove 12 is placed as described above. Further, the inner side of the position the breaking groove 12 is placed is formed as the large bore section 14a having an aperture of which greater than that of the screw hole section 14c. As a result, the female screw thread 14d is not broken at the breaking.

The body portion 13 of the anchor bolt 2 in the example of FIGS. 1 and 2 to support the bolt 60 to be attached after the placement of the anchor 1 is formed hexagonally which is the same as the tool attachment section 11. The outer shapes of the body portion 13 and the tool attachment section 11 are the same. In this state, if a tool such as a two-way open-end wrench of which tips are opened is used for placement of the anchor 1, for example, the body portion 13 may be rotated instead of the tool attachment section 11, resulting in the problem that the breaking groove 12 is not broken even when the torque reaches the fixed value. Therefore, the outer shape of the body portion 13 may be the one shown in FIG. 13.

Figure 13:
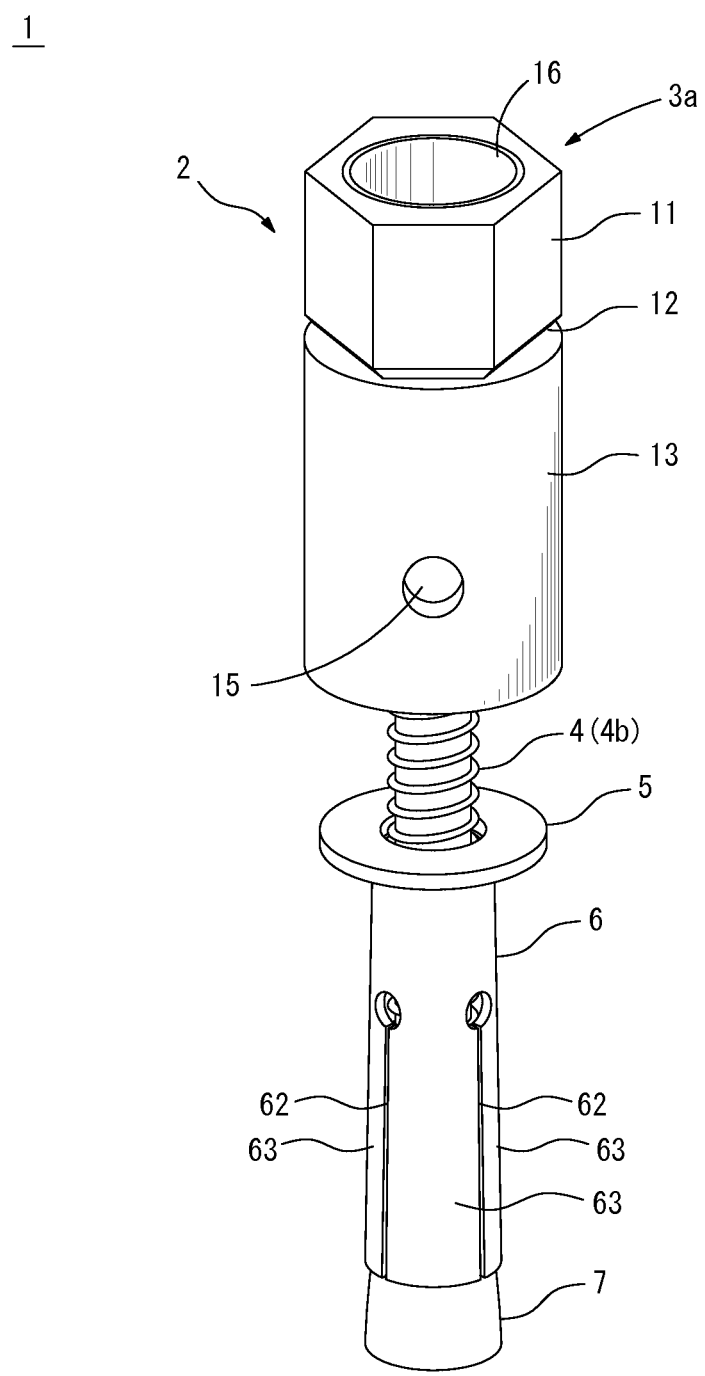
FIG. 13 shows an example of the anchor with a base portion of the anchor bolt in form of a cylinder.

FIG. 13 shows the anchor 1 with the cylindrically-shaped body portion 13. As shown in FIG. 13, the body portion 13 in a form of cylindrical shape may not be rotated even when the tool such as a two-way open-end wrench of which tips are opened is used. The worker controls the rotation by gripping the tool to the tool attachment section 11 provided at the tip surface 3a of the head part 3. In this state, the breaking is caused normally through the breaking groove 12 when the torque reaches the fixed value. So, it prevent from overtightening of the head part 3.

The cap member 16 set in the attachment hole 14 of the anchor bolt 2 in the example of FIGS. 1, 2 and 3 closes the screw hole section 14c at the vicinity of the tapered-shaped diameter reduction section 14b. The entire part of the cap member 16 of the aforementioned structure is placed inside the attachment hole 14. The field supervisor checks to see whether or not the cap member 16 is attached by looking up the ceiling structure from the floor, for example, after the placement of the anchor 1. In such case, it is sometimes difficult for the field supervisor to determine whether the cap member 16 is attached or not if he or she is looking at the ceiling structure under low light condition. The outer shape of the cap member 16 may be the one shown in FIG. 14 to enable the person such as the field supervisor to see the attachment of the cap member 16 more clearly.

Figure 14:
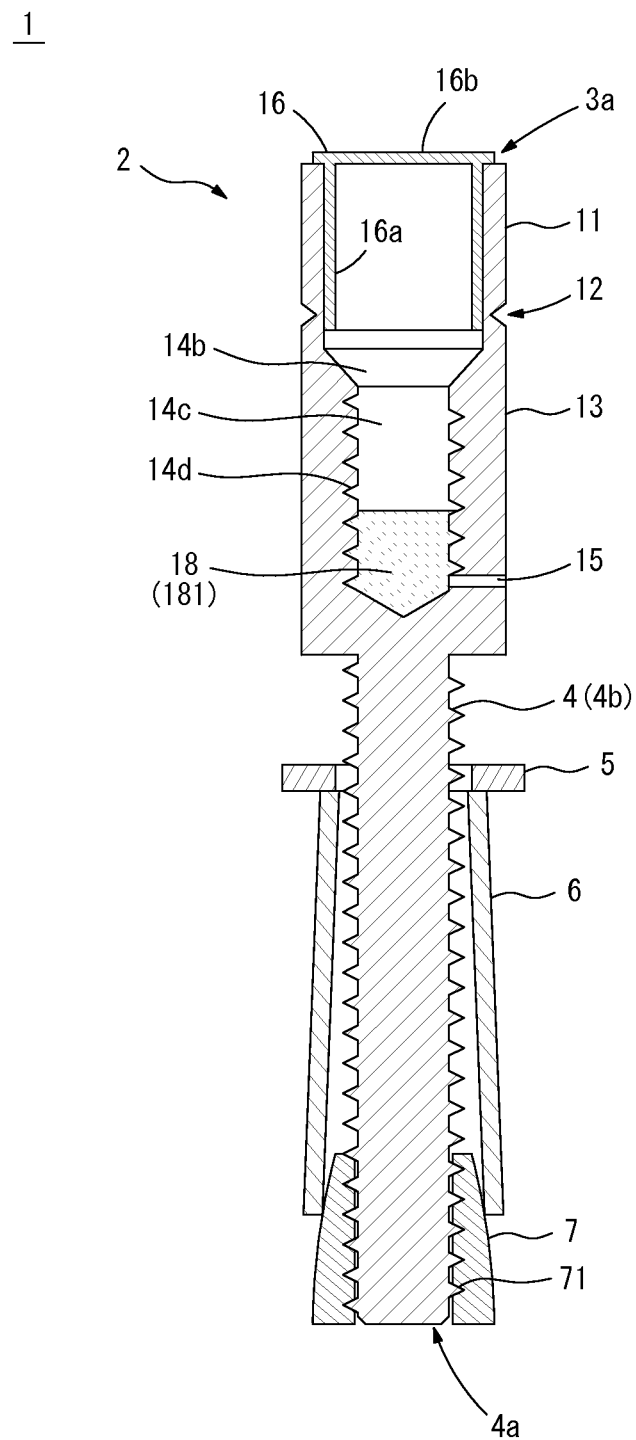
FIG. 14 shows an example of the anchor including a cap member in form of a different shape.

FIG. 14 shows the anchor 1 with the cap member 16 shaped in a different form. The cap member 16 of FIG. 14 includes a lid 16b to close the opening at the tip surface 3a of the attachment hole 14 of the head part 3 of the anchor bolt 2. The cap member 16 closes the attachment hole 14 at the tip surface 3a of the head part 3. The cap member 16 colored in the certain color such as red or yellow enables the person such as the worker or the field supervisor to easily see the attachment of the cap member 16 even when the ceiling structure is under low light condition. Also, a reflective sheet or the like reflects light may be put on the surface of the lid 16b. This makes the check of the attachment much easier.

According to the first preferred embodiment, the cap member 16 is set in the attachment hole 14 of the head part 3 as an example. The cap member 16, however, is not indispensable to make the check of the placement condition of the anchor 1 easy. To be more specific, the circumference of the attachment hole 14 at the tip surface 3a of the head part 3 of the anchor bolt 2 may be colored in an identifiable color such as red or yellow, for example. Use of such anchor bolt 2 enables the worker or the field supervisor to check to see if the breaking groove 12 of the head part 3 is broken from a position relatively far even without the cap member 16 set in the attachment hole 14. So, the cap member 16 is not necessarily set in the attachment hole 14 of the head part 3 of the anchor bolt 2. However, creation of the breaking projections (burrs) may not be prevented after an event, such as wobbling of the shaft at the breaking through the breaking groove 12 without the cap member 16. Further, the connecting bolt 60 may be attached by mistake to the anchor 1 the placement of which is not complete normally. As a result, the cap member 16 is preferably attached to the attachment hole 14 as described above.

Second Preferred Embodiment

A second preferred embodiment of the present invention is described next. The tool is attached to the outer side surface of the tool attachment section 11 according to the first preferred embodiment as described above. In the second preferred embodiment, the tool is attached to the inner side surface of the tool attachment section 11. In the description given below, those elements which have already been described in the first preferred embodiment are represented by the same reference numerals, and these elements are not discussed repeatedly for the same description.

Figure 15:
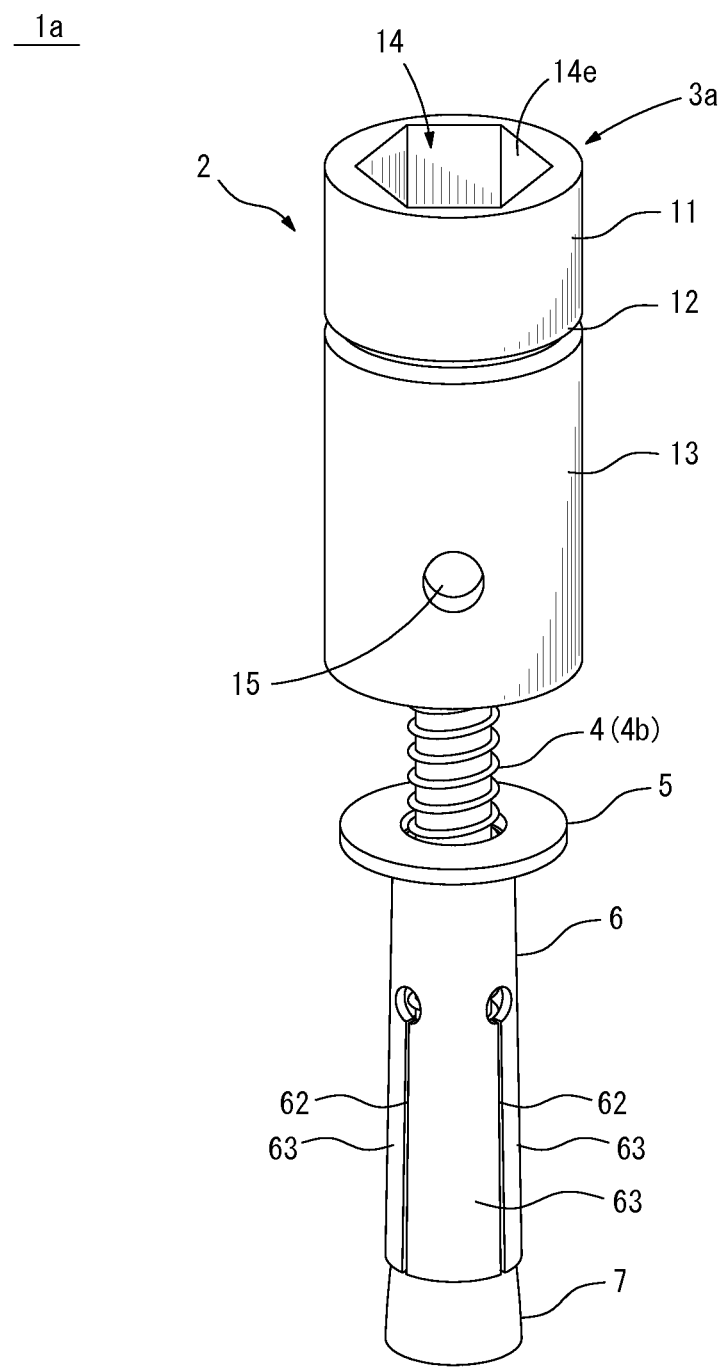
FIG. 15 is a perspective view of an anchor of a second preferred embodiment with all the parts of the anchor assembled.
Figure 16:
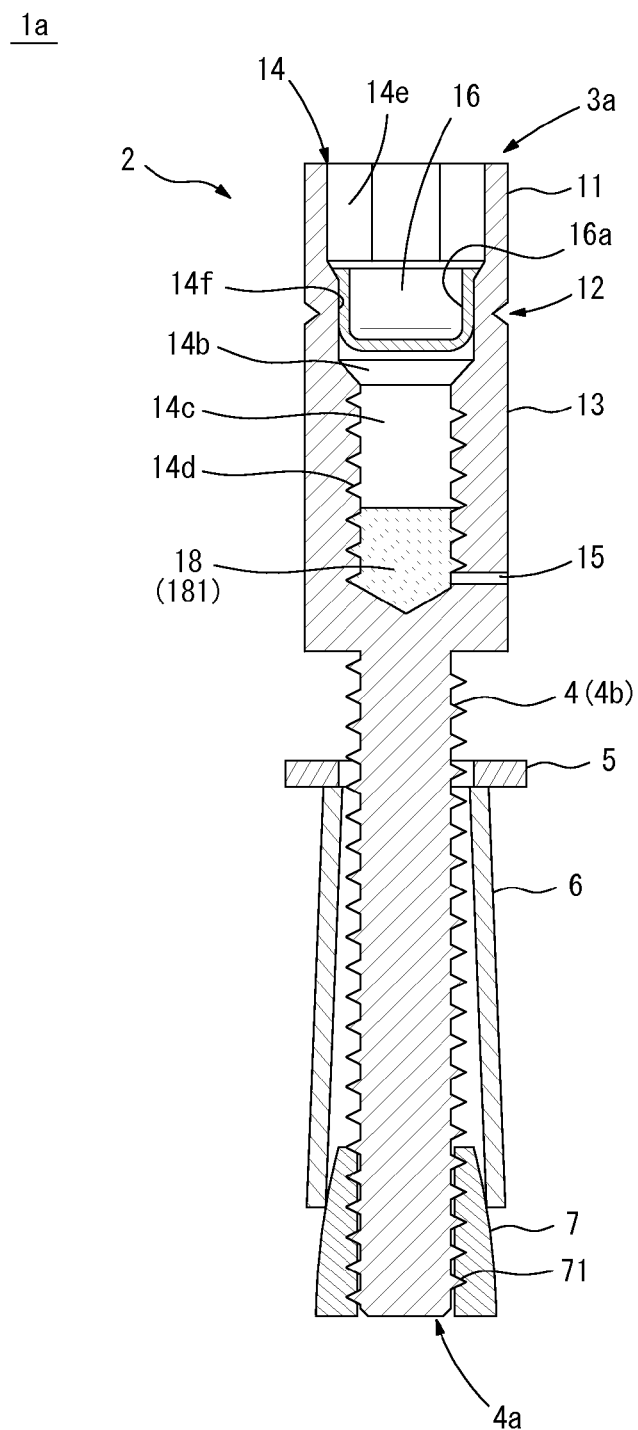
FIG. 16 is a longitudinal sectional view of the anchor of the second preferred embodiment with all the parts of the anchor assembled.

FIG. 15 is a perspective view of an anchor 1a of the second preferred embodiment with all the parts of the anchor 1a assembled. FIG. 16 is a longitudinal sectional view of the anchor 1a with all the parts of the anchor 1a assembled. The anchor 1a of the second preferred embodiment differs from the anchor 1 of the first preferred embodiment in that the head part 3 of the anchor bolt 2 has a different structure. More specifically, the outer shape of the head part 3 as a whole from the tool attachment section 11 to the body portion 13 is formed to be a cylindrical shape. The closed-end attachment hole 14 is defined at the tip surface 3a of the head part 3 to receive therein the connecting bolt 60. A tool hole 14e to which a tool such as a hexagonal wrench is attached is defined in the opening at the attachment hole 14. In the second preferred embodiment, the tool such as the hexagonal wrench is inserted for attachment into the tool hole 14e to cause the head part 3 to rotate in placement of the anchor 1a.

As shown in FIG. 16, a tubular section 14f having the inner diameter of which of a certain length and having the smooth inner surface is included in the bottom portion of the tool hole 14e. The tubular section 14f having the inner side surface of which is flat is provided. The tapered-shaped diameter reduction section 14b having the inner diameter of which reduces is provided at the bottom portion between the tubular section 14f and the bottom end. The closed-end screw hole section 14c with the female screw thread 14d is defined at the bottom portion between the diameter reduction section 14b and the bottom surface.

The circular breaking groove 12 provided at the outer side surface of the head part 3 is placed at a position at the predetermined length from the tip surface 3a of the head part 3. The breaking groove 12 is placed at the bottom portion closer to the bottom surface than the tool hole 14e defined in the attachment hole 14 and is placed between the tip surface 3a of the head part 3 and the diameter reduction section 14b as shown in FIG. 16. To be more specific, the breaking groove 12 is provided at the outer side surface of a position the tubular section 14f is formed. The thickness of the portion which the breaking groove 12 is provided is smaller than other portions of the head part 3. In the second preferred embodiment, by appropriately setting the thickness of the portion with the breaking groove 12, the head part 3 is caused to be broken through the breaking groove 12 when the torque equal to or greater than the fixed value is exerted on the tool attachment section 11 at the tip surface 3a of the head part 3. The torque required for breaking in the head part 3 through the breaking groove 12 may be appropriately set by adjusting the depth of the groove of the breaking groove 12.

The cap member 16 set in the attachment hole 14 is attached to the tubular section 14f in the second preferred embodiment as shown in FIG. 16. The cap member 16 includes the wall section 16a contacted by the inner side surface of the tubular section 14f inside the breaking groove 12 as described in the first preferred embodiment. The function of the wall section 16a is the same as the one described in the first preferred embodiment. The parts of the anchor 1a not given above are the same as those described in the first preferred embodiment.

Figure 17:
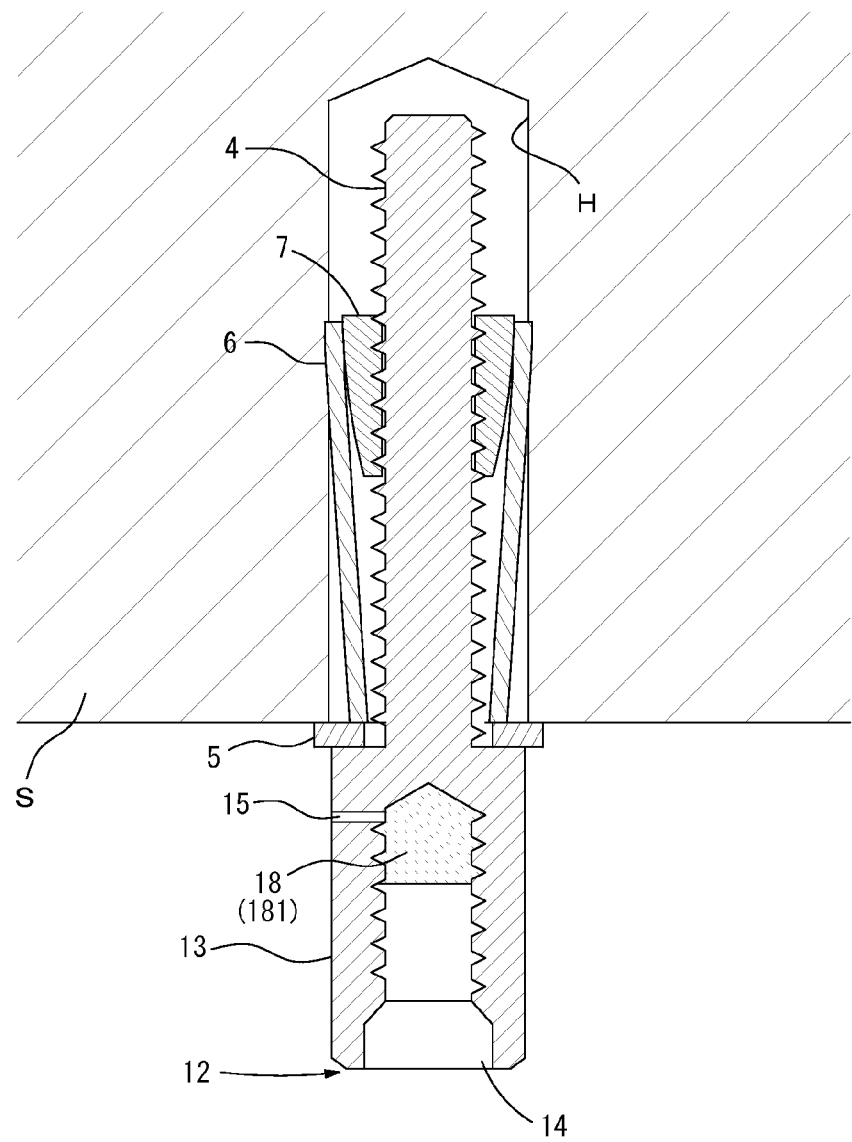
FIG. 17 shows the anchor of the second preferred embodiment with the head part of the anchor bolt broken.
Figure 17:
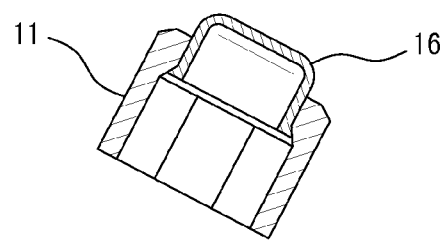

The anchor 1a of the second preferred embodiment is inserted into the skeleton S such as the ceiling structure as described in the first preferred embodiment, and the tool such as the hexagonal wrench is attached to the tool hole 14e defined at the head part 3 of the anchor bolt 2 to rotate. As the torque equal to or greater than the fixed value is exerted on the tool attachment section 11, the head part 3 is broken through the breaking groove 12. FIG. 17 shows the anchor 1 with the head part 3 of the anchor bolt 2 broken. As illustrated in FIG. 17, as well as in the first preferred embodiment, the tool attachment section 11 is separated from the head part 3 with the cap member 16 in response to the breaking in the head part 3 of the anchor bolt 2 through the portion with the breaking groove 12. According to the second preferred embodiment, the head part 3 of the anchor bolt 2 is broken through the breaking groove 12. This state means that the anchor 1a is favorably fixed to the skeleton S, and the placement is complete.

The connecting bolt 60 is attached to the opened attachment hole 14 after the head part 3 is broken as shown in FIG. 17, which is the same as that in the first preferred embodiment. At the attachment of the bolt 60 or at the check of the attachment condition of the bolt 60, the worker or the field supervisor may easily determine the condition if the anchor 1a is placed favorably by checking whether or not the deformable material 18 goes outside the side surface of the head part 3. The flexible material 181 made of oil-based clay as shown in FIG. 17 may be used as the deformable material 18. Further, the component 182 of the first preferred embodiment may also be used.

While the cap member 16 is also set in the attachment hole 14 of the head part 3 as an example according to the second preferred embodiment. The cap member 16, however, is not indispensable as described in the first preferred embodiment. The cap member 16 is not necessarily set in the attachment hole 14.

Third Preferred Embodiment

A third preferred embodiment of the present invention is described next. The anchor bolt 2 is used as a part of the anchor 1 or the anchor 1a in the above-described first and second preferred embodiments. In the third preferred embodiment, a connecting nut 8 is used. In the description given below, those elements which have already been described in the first preferred embodiment are represented by the same reference numerals, and these elements are not discussed repeatedly for the same description.

Figure 18:
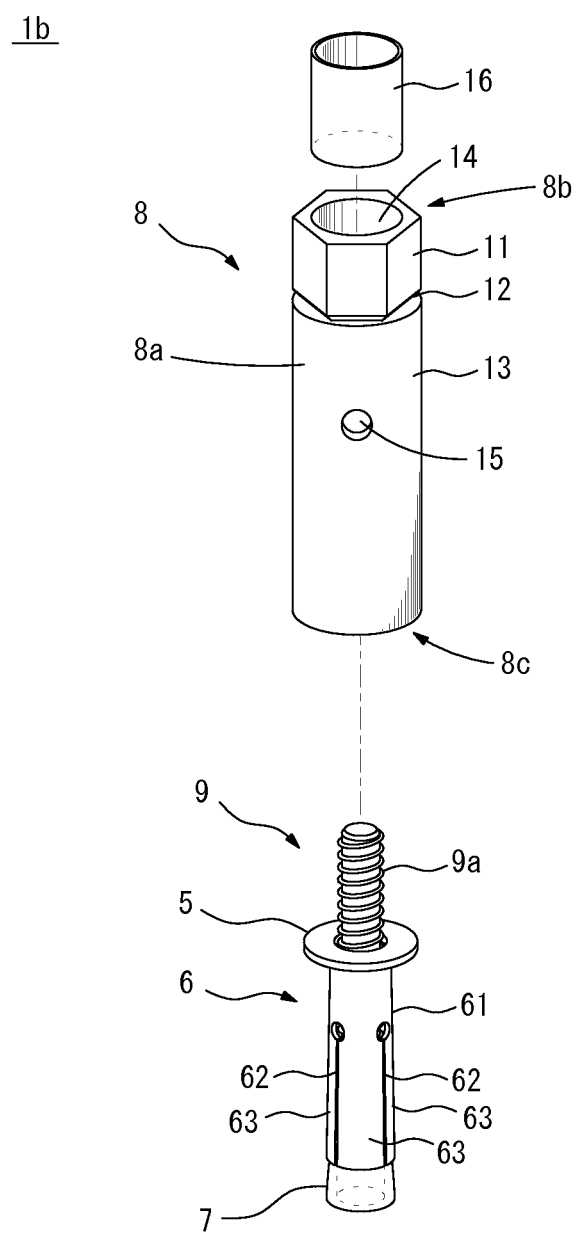
FIG. 18 is a perspective view of an anchor of a third preferred embodiment of with all parts of the anchor separated.
Figure 19:
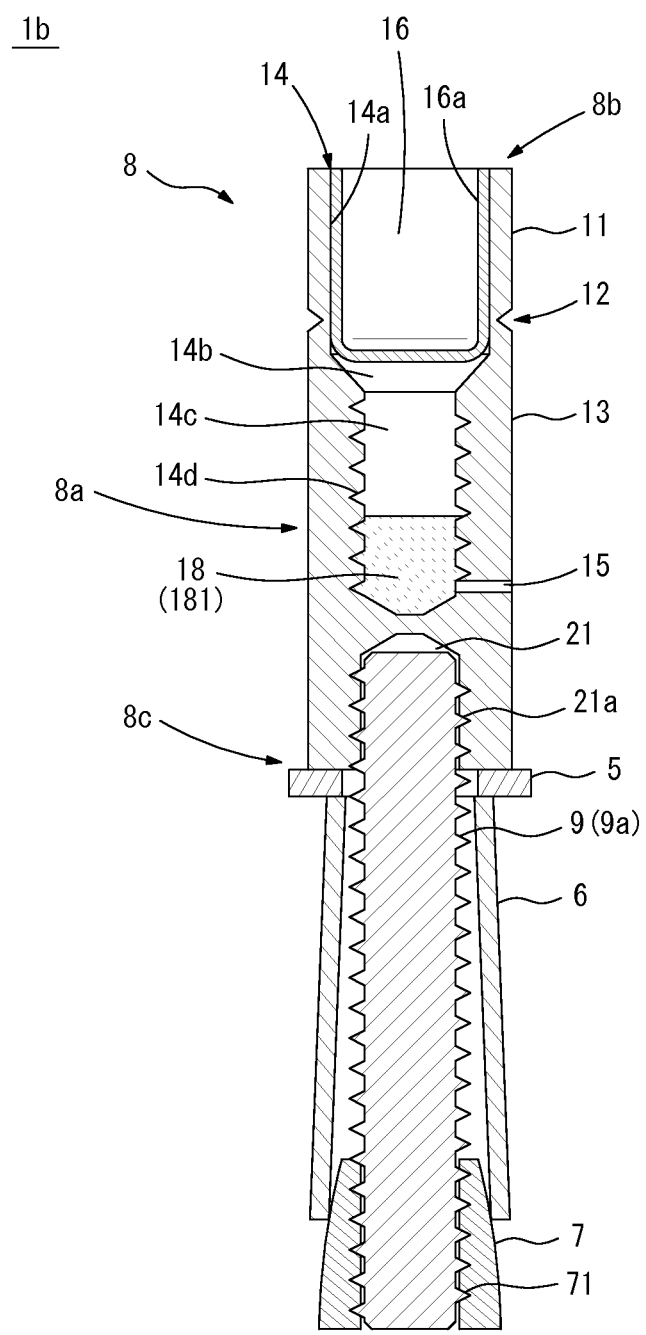
FIG. 19 is a longitudinal sectional view of the anchor the third preferred embodiment with all the parts of the anchor assembled.

FIG. 18 is a perspective view of an anchor 1b of the third preferred embodiment. FIG. 19 is a longitudinal sectional view of the anchor 1b with all the parts of the anchor assembled. As shown in FIG. 18, the anchor 1b of the third preferred embodiment includes the connecting nut 8, a shaft member 9, the washer 5, the spreading sleeve 6, the cone nut 7 and the cap member 16.

The shaft member 9 of a predetermined length in the axial direction has the outer side surface of a metal shaft member of which with a male screw thread 9a. The connecting nut 8 is formed by a metal member 8a of a predetermined length in the axial direction. The closed-end first attachment hole 14 is defined at one end surface 8b and a closed-end second attachment hole 21 is defined at an opposite end surface 8c of the connecting nut 8. The shaft member 9 is to be attached to the second attachment hole 21 of the connecting nut 8. Inside of the second attachment hole 21 is provided with a female screw thread 21a that threadedly engages the male screw thread 9a of the shaft member 9. The connecting bolt 60 different from the shaft member 9 is attached to the first attachment hole 14 of the connecting nut 8. The shaft member 9 and the connecting bolt 60 are connected in the axial direction.

The cap member 16 to close the first attachment hole 14 is set in the first attachment hole 14 defined at the one end surface 8b of the connecting nut 8 so that the attachment of the connecting bolt 60 in a state that the placement of the anchor 1b is not complete is prevented. The cap member 16 may be made of metal or a flexible shaped resin. The cap member 16 is preferred to be colored in a certain color such as red or yellow. This specific feature makes it possible to be visible from afar.

The ring-shaped breaking groove 12 is provided at an outer side surface of the connecting nut 8 at a predetermined length from the one end surface 8b. One end portion between the one end surface 8b and the breaking groove 12 of the connecting nut 8 is formed as the tool attachment section 11 to be gripped by the tool such as the torque wrench to rotate. The outer shape of the tool attachment section 11 is formed hexagonally as shown in the example of FIG. 18. An opposite end portion of the connecting nut 8 between the opposite end surface 8c and the breaking groove 12 is formed as the body portion 13 to hold the bolt 60 to be attached later.

As shown in FIG. 19, the inner diameter from the opening at the tip portion of the first attachment hole 14 defined at the one end surface 8b of the connecting nut 8 to a position at a depth of a predetermined value is formed to have a certain length. The portion between the opening at the tip portion and the position forms the tubular large bore section 14a having the inner side surface of which is flat. The large bore section 14a includes a tapered-shaped diameter reduction section 14b having the inner diameter of which reduces at the side of its bottom portion. The screw hole 14c with the female screw thread 14d is defined in the bottom portion between the diameter reduction section 14b and the bottom surface. The breaking groove 12 provided at the outer side surface of the connecting nut 8 is placed closer to the one end surface 8b of the connecting nut 8 than the diameter reduction section 14b of the first attachment hole 14 as shown in FIG. 19. To be more specific, the breaking groove 12 is provided at the outer side surface of a portion at which the large bore section 14a is formed. The thickness of the portion with the breaking groove 12 is smaller than other portions of the connecting nut 8. In the third preferred embodiment, by appropriately setting the thickness of the portion with the breaking groove 12, the connecting nut 8 is caused to be broken through the breaking groove 12 when the torque equal to or greater than the fixed value is exerted on the tool attachment section 11 placed at the one end surface 8b of the connecting nut 8. The torque required for breaking in the connecting nut 8 through the breaking groove 12 may be appropriately set by adjusting the depth of the breaking groove 12.

The cap member 16 set in the attachment hole 14 includes the wall section 16a contacted by the inner side surface of the large bore section 14a in the breaking groove 12 as illustrated in FIG. 19. The wall section 16a contacted by the inner side surface of the large bore section 14a prevents the cap member 16 from falling from the first attachment hole 14 and contributes to no breaking projections (burrs) projecting into the first attachment hole 14 in breaking in the connecting nut 8 through the portion with the breaking groove 12 as described in the first and second preferred embodiments. The cap member 16 also serves as a dustproof cap also in the third preferred embodiment.

The screw hole section 14c defined at the innermost of the first attachment hole 14 receives the connecting bolt 60 different from the shaft member 9 threadedly attached thereto. The through hole 15 communicatively coupled to the outer side surface of the metal member 8a is defined in the bottom portion and its vicinity of the screw hole section 14c. The bottom portion of the screw hole portion section 14c is provided with the deformable material 18 that deforms in response to threadedly attachment of the connecting bolt. The deformable material 18 is the same as the one described in the first preferred embodiment. In the example of FIG. 19, the flexible material 181 such as oil-based clay is used as the deformable material 18. The component 182 described in the first preferred embodiment may also be used as the deformable material 18.

The washer 5, the expansion sleeve 6 and the cone nut 7 are inserted and attached in this order to the one end portion of the shaft member 9 as shown in FIG. 18. In the third preferred embodiment, by attaching the opposite end portion of the shaft member 9 to the second attachment hole 21, the anchor 1b the same as the one in the first preferred embodiment is constructed. After the anchor 1b is inserted into the skeleton S such as the ceiling structure for example, the tool such as the torque wrench is attached to the tool attachment section 11 formed at the one end portion of the connecting nut 8 to rotate. The rotation of the tool attachment section 11 formed at the one end portion between the one end surface 8b and the breaking groove 12 of the connecting nut 8 causes the shaft member 9 attached to the second attachment hole 21 to rotate, thereby driving the cone nut 7 into the spreading sleeve 6 as described in the first preferred embodiment. The cone nut 7 then makes the spreading parts 63 of the spreading sleeve 6 spread outwardly. As a result, the anchor 1b is fixed to the skeleton S. The one end portion of the connecting nut 8 between the one end surface 8b and the breaking groove 12 is caused to be broken through the breaking groove 12 when the torque equal to or greater than the fixed value is exerted on the tool attachment section 11.

Figure 20:
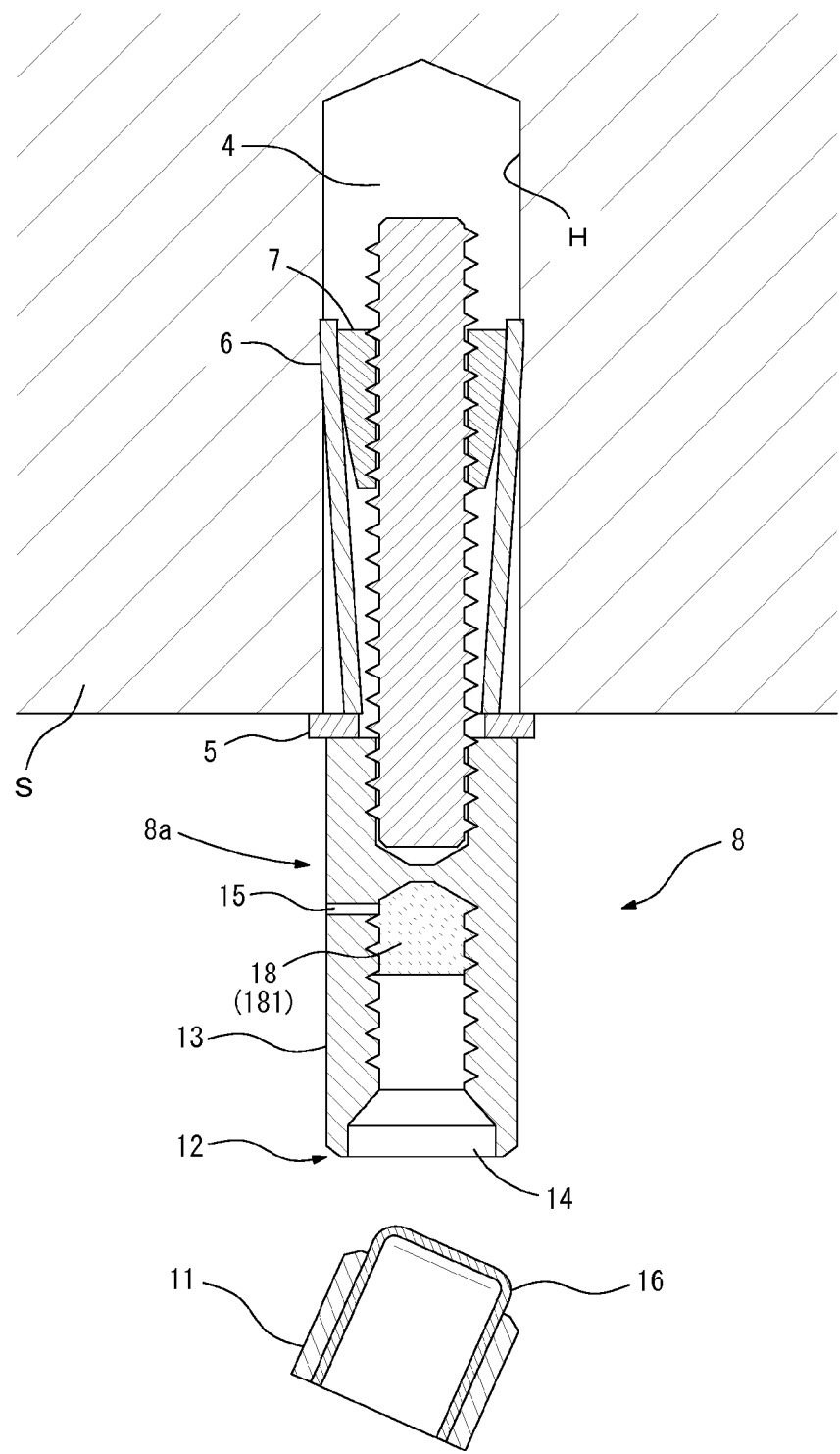
FIG. 20 shows the anchor of the third preferred embodiment with one part of the connecting nut broken.

FIG. 20 shows the anchor 1b with one portion of the connecting nut 8 broken. As illustrated in FIG. 20, the tool attachment section 11 of the third preferred embodiment is separated from the connecting nut 8 together with the cap member 16 in response to the breaking in the one end portion of the connecting nut 8 through the portion with the breaking groove 12. So, according to the third preferred embodiment, the state that the one end portion of the connecting nut 8 being broken through the breaking groove 12 means that the anchor 1b is favorably fixed to the skeleton S, so the placement is complete.

The connecting bolt 60 is attached to the opened first attachment hole 14 after the one end portion of the connecting nut 8 is broken as shown in FIG. 20, which is the same as in the first preferred embodiment. At the attachment of the bolt 60 or at the check of the attachment condition of the bolt 60, the worker or the field supervisor may easily determine the condition if the connecting nut 8 is placed favorably by checking whether or not the deformable material 18 goes outside through the through hole 15 defined at the side surface of the connecting nut 8.

In the third preferred embodiment, the connecting nut 8 is used as the anchor 1b. However, the use of the connecting nut 8 is not limited to this. The connecting nut 8 may also be used as a connecting fitting to simply connect two bolts in the axial direction.

The above-described body portion 13 of the connecting nut 8 is in the form of a cylinder. The body portion 13 is not necessarily in the form of the cylinder, and may be in the form of the same shape as the tool attachment section 11. However, in order to prevent the rotation at the body portion 13 after the attachment of the tool to the body portion 13, the body portion 13 is preferably in the form of the cylinder.

While the cap member 16 is also attached to the first attachment hole 14 defined at the one end surface 8b of the connecting nut 8 as an example according to the third preferred embodiment. The cap member 16, however, is not intended to be indispensable as described in the first preferred embodiment. The cap member 16 is not necessarily set in the first attachment hole 14.

Forth Preferred Embodiment

A forth preferred embodiment of the present invention is described next. According to the above-described first, second and third preferred embodiments, the connecting bolt 60 is attached to the attachment hole 14 after placement of the anchor 1, 1a or 1b. In the forth preferred embodiment, a connecting bolt is not attached to the placed anchor. In the description given below, those elements which have already been described in the first preferred embodiment are represented by the same reference numerals, and these elements are not discussed repeatedly for the same description.

Figure 21:
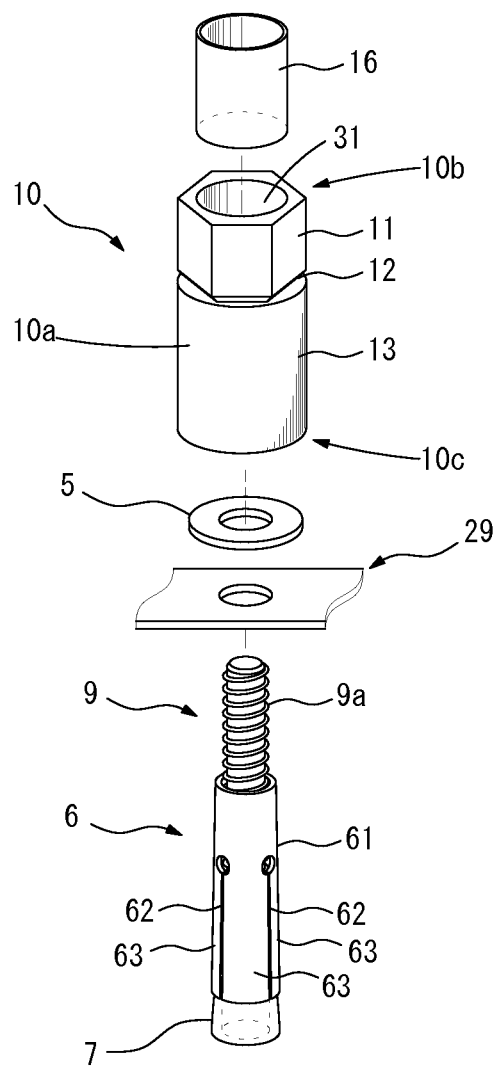
FIG. 21 is a perspective view of each part constructing an anchor of a forth preferred embodiment.

FIG. 21 is a perspective view of each part constructing an anchor 1c of the forth preferred embodiment. As shown in FIG. 21, the anchor 1c of the forth preferred embodiment includes a clamping nut 10, the shaft member 9, the washer 5, the spreading sleeve 6, the cone nut 7 and the cap member 16. The shaft member 9 of the predetermined length in the axial direction has the outer side surface of the metal shaft member with the male screw thread 9a which is the same as that described in the third preferred embodiment.

Figure 22:
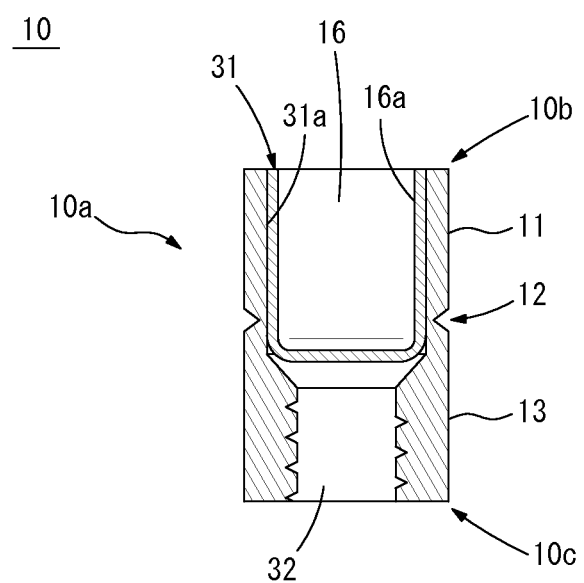
FIG. 22 is a longitudinal sectional view of a structure of a clamping nut.

FIG. 22 is a longitudinal sectional view of a structure of the clamping nut 10. A metal member 10a of a predetermined length in the axial direction as shown in FIG. 22 forms the clumping nut 10. A circular hole 31 to set therein the cap member 16 is defined at the one end surface 10b and a screw hole 32 to receive therein the shaft member 9 is defined at its opposite end surface 10c. The inner diameter from the one end surface 10b of the metal member 10a to a position at a depth of a predetermined value is formed to have the predetermined length. The screw hole 32 is defined in an opposite end portion of the metal member 10a between the opposite end surface 10c and a position at a depth of a predetermined value. In the example of FIG. 22, the circular hole 31 and the screw hole 32 are communicatively coupled to each other in the clumping nut 10. Those holes are not necessarily being communicatively coupled to each other.

An inner side surface 31a of the circular hole 31 is flat. The above-described cap member 16 is set in the circular hole 31. The inner diameter of the screw hole 32 corresponds to the outer diameter of the shaft member 9. The screw hole 32 is provided with a female screw thread that threadedly engages the male screw thread 9a of the shaft member 9 at its inner side surface. In the forth preferred embodiment, the circular hole 31 and the screw hole 32 are communicatively coupled to each other in the clumping nut 10 and the inner diameter of the screw hole 32 is smaller than that of the circular hole 31.

An outer side surface of the clamping nut 10 is given the ring-shaped breaking groove 12 at the predetermined length from the one end surface 10b thereof. The clumping nut 10 includes its one end portion between the one end surface 10b and the breaking groove 12 formed as the tool attachment section 11 which is gripped by the tool such as the torque wrench to rotate. The outer shape of the tool attachment section 11 is formed hexagonally as shown in the example of FIG. 21. The opposite end portion of the clumping nut 10 between the opposite end surface 10c and the breaking groove 12 is formed as the body portion 13 to support the anchor 1c with receiving the anchor 1c therein. The outer shape of the body portion 13 is in the form of the cylinder in the example of FIG. 21. The outer shape of the body portion 13 may be in the form of hexagonal shape as well as the tool attachment section 11.

The breaking groove 12 provided at the outer side surface of the clumping nut 10 is placed at a predetermined position within a portion in which the large bore section 14a is formed. The thickness of the portion with the breaking groove 12 is smaller than other portions. In the forth preferred embodiment, by appropriately setting the thickness of the portion with the breaking groove 12, the one end portion between the one end surface 10b and the breaking groove 12 is caused to be broken through the breaking groove 12 when the torque equal to or greater than the fixed value is exerted on the tool attachment section 11 in the one end portion of the clumping nut 10. The torque required for breaking in the one end portion through the breaking groove 12 may be appropriately set by adjusting the depth of the breaking groove 12 as described in the first to third preferred embodiments.

The cap member 16 set in the circular hole 31 includes the wall section 16a contacted by the flat inner side surface 31a of the circular hole 31 at inner side of the breaking groove 12 as illustrated in FIG. 22. The wall section 16a contacted by the inner side surface of the circular hole 31 prevents the cap member 16 from falling from the circular hole 31 and contributes to no breaking projections (burrs) projecting into the circular hole 31 in breaking in the clumping nut 10 through the portion with the breaking groove 12 as described in the first to third preferred embodiments.

The expansion sleeve 6 and the cone nut 7 are attached to the shaft member 9 of the anchor 1c of the forth preferred embodiment and a fixation object 29 to fix the anchor 1c to the skeleton S is attached between the expansion sleeve 6 and the washer 5 as shown in FIG. 21. The male screw thread 9a of the shaft member 9 is attached to the closed-end screw hole 32 of the clumping nut 10. The tool such as the torque wrench is attached to the tool attachment section 11 of the clumping nut 10 to rotate in this state. As a result, the rotation causes the fixation of the anchor 1c to the skeleton S.

Figure 23:
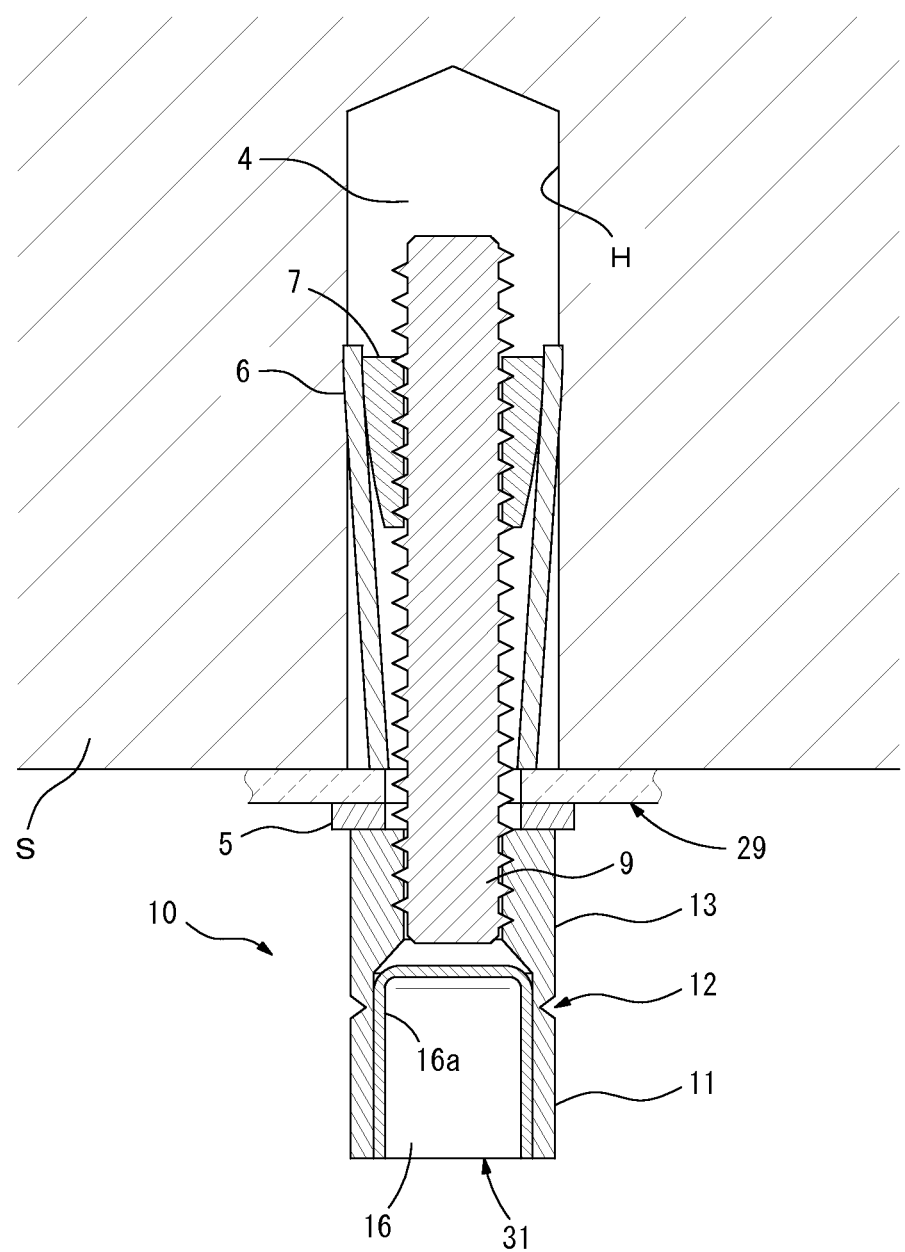
FIG. 23 shows an example of a process of placing the anchor of the forth preferred embodiment.
Figure 24:
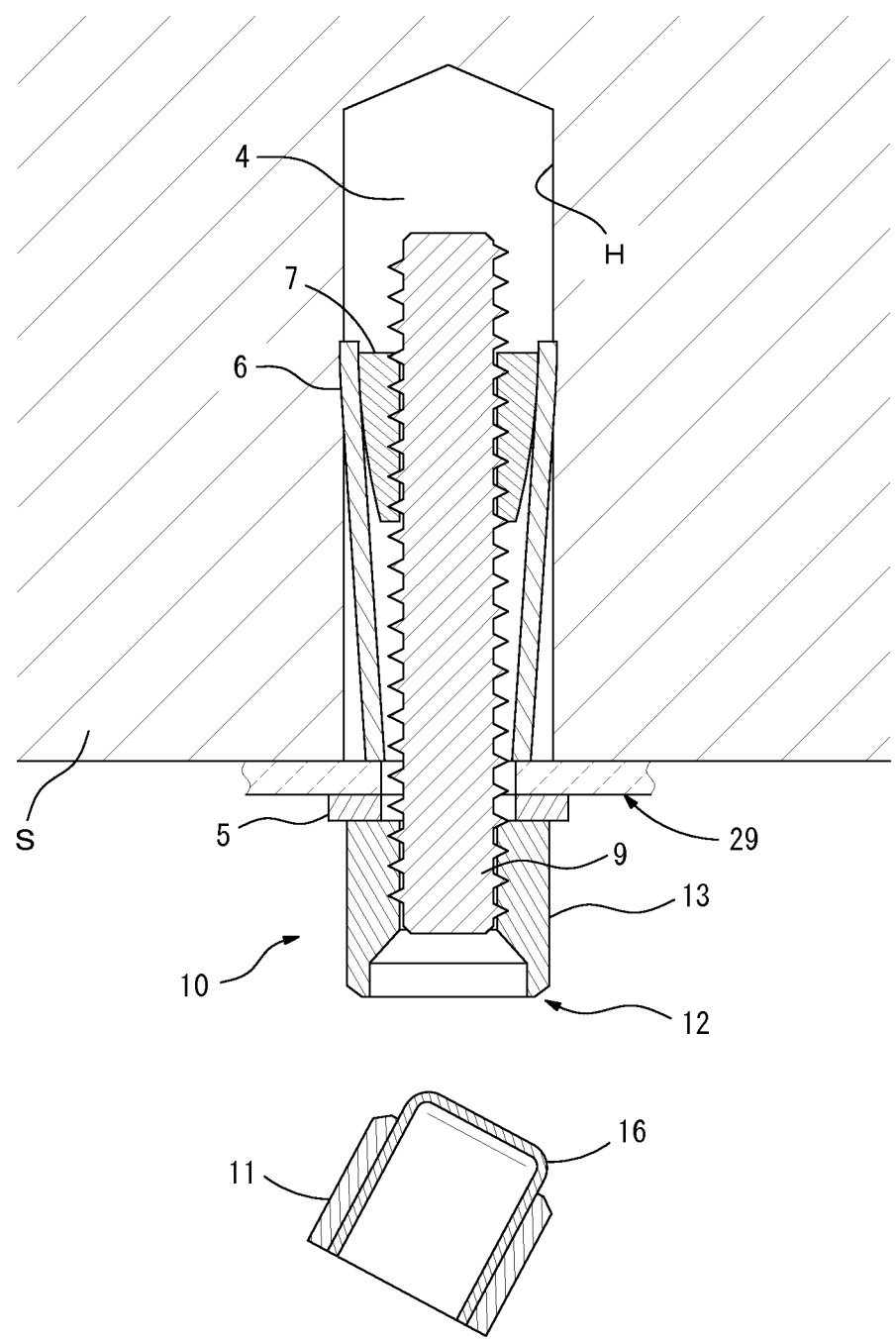
FIG. 24 shows the anchor of the forth preferred embodiment with one part of a clamping nut broken.

FIGS. 23 and 24 show an example of a process of placing the anchor 1c of the forth preferred embodiment. First, as shown in FIG. 23, the shaft member 9 with the expansion sleeve 6 and the cone nut 7 attached thereto is inserted into the hole H defined in advance in the skeleton S such as the ceiling structure. In this state, the tip end of the shaft member 9 projects from the hole H in the skeleton S. The fixation object 29 in which a hole to insert the shaft member 9 is defined is attached to the skeleton S and the clumping nut 10 is attached to the shaft member 9 through the washer 5.

In this state, the tool such as the torque wrench is attached to clumping nut 10 to rotate. The rotation at the clumping nut 10 causes the shaft member 9 to rotate together, thereby driving the cone nut 7 into the spreading sleeve 6. As a result, the spreading parts 63 of the spreading sleeve 6 is spread outwardly as shown in a radius direction such that they press the inner wall of the hole H, thereby fixing the anchor 1c to the hole H.

The rotation of the clumping nut 10 by controlling the tool attached to clumping nut 10 increases the torque gradually. The fixation of the anchor 1c to the hole H with sufficient intensity creates the torque in rotation of the tool attachment section 11 equal to or greater than the fixed value. As a result, the torque equal to or greater than the fixed value exerted on the tool attachment section 11 causes the clumping nut 10 to be broken through the portion with the breaking groove 12, thereby making the tool attachment section 11 separating from the clumping nut 10 with the cap member 16. As described above, the tool is attached to the tool attachment section 11 to perform placement, and the clumping nut 10 is broken through the breaking groove 12. The state of the breaking means that the anchor 1c is fixed to the skeleton S favorably and the placement is complete.

In response to the firmly fixation of the anchor 1c to the skeleton S, the fixation object 29 is firmly fixed to the skeleton S as well as the anchor 1c. In the forth preferred embodiment, as the fixation object 29 is successfully fixed to the skeleton S, the process of placing the anchor 1c is complete.

The shaft part 9 is clamped with using the clumping nut 10, so that the anchor 1c of the forth preferred embodiment is placed. The clumping nut 10 includes the cap member 16 set in the circular hole 31 with being contacted by the inner side surface 31a of the circular hole 31. The ring-shaped breaking groove 12 provided at the outer side surface of the metal member 10a is placed at a predetermined position within a portion in which the circular hole 31 is formed. The state that the clumping nut 10 of the anchor 1c with the cap member 16 attached thereto indicates that the anchor 1c has not been placed yet. The clumping nut 10 without the cap member 16 indicates that the anchor 1c has been placed and the placement condition thereof is favorable.

In the forth preferred embodiment, the clumping nut 10 is used as the anchor 1c. However, the use of the clumping nut 10 is not limited to this. The clumping nut 10 may also be used by attaching to a simple bolt.

While the cap member 16 is set in the circular hole 31 defined at the one end surface 10b of the clumping nut 10 as an example according to the forth preferred embodiment. The cap member 16, however, is not intended to be indispensable as described in the first preferred embodiment. The cap member 16 is not necessarily intended to be set in the circular hole 31.

(Modifications)

The aforementioned anchors 1, 1a, 1b and 1c are of the preferred embodiments of the anchor of the present invention. Modifications and variations of the specific structures of the anchors 1, 1a, 1b and 1c described below can be devised where appropriate as long as they do not depart from the scope of the invention. The aforementioned anchors 1, 1a, 1b and 1c are suited for attachment especially to ceiling structures. However, the anchors 1, 1a, 1b and 1c are not necessarily intended to be fixed to ceiling structures.

In the above-described first and second preferred embodiments, the shaft part 4 and the head part 3 of the anchor bolt 2 are formed integrally. However, those parts are not necessarily intended to be formed integrally. FIGS. 25A and 25B show an exemplary structure of the anchor bolt 2 having the shaft part 4 and the head part 3 provided separately. FIG. 25A shows an example of the shaft part 4 and the head part 3 separately provided. The shaft part 4 includes a flange 4d placed at a position from the predetermined distance from below and a male screw thread part 4c of a predetermined length formed in a lower portion between the flange 23b and the lower surface. The screw hole section 14c (the attachment hole 14) is defined such that penetrates through the head part 3 in the axial direction (vertical direction) to extend further into the head part 3. The through hole 15 as described above is defined at the side surface of the head part 3. The through hole 25 penetrates into the screw hole section 14c defined in the head part 3.

The male screw thread part 4c formed in the lower portion of the shaft part 4 is attached to the opened screw hole section 14c defined at one end surface of the head part 3 as shown in FIG. 25A. As the male screw thread part 4c is threadedly driven deeper into the screw hole section 14c, the flange 4d placed at the shaft part 4 is caused to be in contact with the side surface of the head part 3, and the shaft part 4 and the head part 3 are fixed to each other. As a result, the anchor bolt 2 having the shaft part 4 and the head part 3 formed integrally is structured as illustrated in FIG. 25B.

As the shaft part 4 and the head part 3 are fixed to each other as described above, a tip portion 4e of the male screw thread part 4c at the shaft part 4 is placed at a position determined in advance of the screw hole section 14c defined in the head part 3, thereby functioning as the bottom portion of the screw hole section 14c. When the above-described connecting bolt 60 is attached to the anchor bolt 2 having the shaft part 4 and the head part 3 formed integrally, the tip portion 4e of the male screw thread part 4c becomes the bottom portion of the screw hole section 14c. The bottom portion of the screw hole section 14c is provided with the above-described deformable material 18. As already described in the first and the second preferred embodiments, in response to the insertion of the connecting bolt 60 into the screw hole section 14c from the attachment hole 14, the deformable material 18 is deformed between the tip portion of the connecting bolt 60 and the bottom portion of the screw hole section 14c, thereby causing one part of the deformable material 18 to project outside of the head part 3 through the through hole 15.

What is claimed is:

1. An anchor bolt comprising:
a shaft part with a male screw thread; and
a head part connected to said shaft part and having an attachment hole with a closed-end bottom to receive a bolt therein defined at a tip surface of said head part and a breaking groove provided at an outer side surface of said head part, wherein
said breaking groove is formed at an outer surface of a portion in which said attachment hole is defined,
a torque equal to or greater than a fixed value exerted on a tip portion between the tip surface and said breaking groove of said head part causes said breaking groove to be broken, thereby causing the tip portion between said tip surface and said breaking groove of said head part to be removed,
said head part has a diameter reduction section having an inner diameter that reduces at a predetermined depth in said attachment hole from the tip surface, and a screw hole section with a female screw thread provided at a bottom portion between said diameter reduction section and a bottom portion in said attachment hole, and
said breaking groove is placed at a predetermined position between the tip surface and the portion in which said diameter reduction section is formed.

2. An anchor bolt comprising:
a shaft part with a male screw thread; and
a head part connected to said shaft part and having an attachment hole with a closed-end bottom to receive a bolt therein defined at a tip surface of said head part and a breaking groove provided at an outer side surface of said head part, wherein
said breaking groove is formed at an outer surface of a portion in which said attachment hole is defined,
a torque equal to or greater than a fixed value exerted on a tip portion between the tip surface and said breaking groove of said head part causes said breaking groove to be broken, thereby causing the tip portion between said tip surface and said breaking groove of said head part to be removed, and
the anchor bolt further comprising a cap member set in said attachment hole to close said attachment hole, wherein said cap member is removed from said head part together with the tip portion between the tip surface and said breaking groove of said head part at the time of breaking in said breaking groove.

3. The anchor bolt according to claim 2, wherein said cap member includes a wall section contacted by an inner side surface of said attachment hole in said breaking groove.

4. An anchor bolt comprising:
a shaft part with a male screw thread; and
a head part connected to said shaft part and having an attachment hole with a closed-end bottom to receive a bolt therein defined at a tip surface of said head part and a breaking groove provided at an outer side surface of said head part, wherein
said breaking groove is formed at an outer surface of a portion in which said attachment hole is defined,
a torque equal to or greater than a fixed value exerted on a tip portion between the tip surface and said breaking groove of said head part causes said breaking groove to be broken, thereby causing the tip portion between said tip surface and said breaking groove of said head part to be removed, and
the tip portion between the tip surface and said breaking groove of said head part is formed as a tool attachment section for rotation control, and a body portion between said breaking groove and said shaft part being in the form of a circular cylinder.

5. An anchor bolt comprising:
a shaft part with a male screw thread; and
a head part connected to said shaft part and having an attachment hole with a closed-end bottom to receive a bolt therein defined at a tip surface of said head part and a breaking groove provided at an outer side surface of said head part, wherein
said breaking groove is formed at an outer surface of a portion in which said attachment hole is defined,
a torque equal to or greater than a fixed value exerted on a tip portion between the tip surface and said breaking groove of said head part causes said breaking groove to be broken, thereby causing the tip portion between said tip surface and said breaking groove of said head part to be removed, and
the anchor bolt further comprising:
a deformable material provided in the bottom portion of said attachment hole and deforms in response to attachment of said bolt, wherein
said head part has a through hole communicatively coupled to the outer side surface of said head part, said through hole being defined in the bottom portion and its vicinity of said attachment hole, and
attachment of said bolt to said attachment hole causes said deformable material to deform and one part of said deformable material to project outside through said through hole.

6. The anchor bolt according to claim 5, wherein said deformable material is a flexible material made of oil-based colored clay.

7. The anchor bolt according to claim 5, wherein
said deformable material includes an attachment part attached to the bottom portion of said attachment hole and a flexible part bended in advance into a substantial V-shape and one end of which being fixed to said attachment part while an opposite end being placed to face said through hole, and
said flexible part is caused to expand the bended portion in response to the attachment of said bolt to said attachment hole, thereby allowing the opposite end placed to face said through hole to project outside through said through hole.

8. A connecting nut formed by a metal member of a predetermined length in the axial direction that includes a first attachment hole defined at one end surface and a second attachment hole defined at an opposite end surface, a different bolt being attached to each of said first and second attachment hole, wherein
said connecting nut includes a breaking groove at an outer side surface of said metal member, said breaking groove being placed at a predetermined position at an outer surface of a portion in which said first attachment hole is defined, and
a torque equal to or greater than a fixed value exerted on one end portion between the one end surface and said breaking groove causes said breaking groove to be broken, thereby causing said one end portion between the one end surface and said breaking groove of said metal member to be removed.

9. The connecting nut according to claim 8, wherein
said first attachment hole includes a diameter reduction section having an inner diameter that reduces at a predetermined depth from the one end surface of said medal member, and a screw hole section including a female screw thread provided at said opposite end portion between the opposite end surface and said diameter reduction section, and said breaking groove is placed at a predetermined position between the one end surface and the portion in which said diameter reduction section is formed.

10. The connecting nut according to claim 8, further including:
a cap member set in said first attachment hole to close said first attachment hole, wherein
said cap member is removed from said metal member together with said one end portion between the one end surface and said breaking groove of said metal member at the time of breaking in said breaking groove.

11. The connecting nut according to claim 10, wherein
said cap member includes a wall section contacted by an inner side surface of said first attachment hole in said breaking groove.

12. The connecting nut according to claim 8, wherein
said one end portion between the one end surface and said breaking groove of said metal member is formed as a tool attachment section for rotation control, and said opposite end portion between said breaking groove and the opposite end surface is formed as a cylindrical body portion.

13. The connecting nut according to claim 8, further including:
a deformable material provided in the bottom portion of said attachment hole and deforms in response to attachment of said bolt, wherein
said metal member has a through hole at a bottom portion and its vicinity at a predetermined depth in said first attachment hole from the one end surface of said metal member, said through hole being communicatively coupled to the outer side surface of said metal member, and
attachment of said bolt to said first attachment hole causes said deformable material to deform and one part of said deformable material to project outside through said through hole.

14. The connecting nut according to claim 13, wherein said deformable material is a flexible material made of oil-based colored clay.

15. The connecting nut according to claim 13, wherein
said deformable material includes an attachment part attached to the bottom surface of said first attachment hole and a flexible part bended in advance into a substantial V-shape and one end of which being fixed to said attachment part while an opposite end being placed to face said through hole, and
said flexible part is caused to expand the bended portion in response to the attachment of said bolt to said first attachment hole, thereby allowing the opposite end placed to face said through hole to project outside through said through hole.

16. An anchor, comprising:
a shaft part with a male screw thread;
a spreading sleeve including spreading parts formed at a tip portion of a tubular body that permits said shaft part to pass therethrough, the spreading parts being formed by a longitudinally cut slot in such a manner that the spreading parts spread outwardly;
a cone nut having the outer diameter of which gradually reduces in the axial direction of said shaft part, the cone nut including a screw through hole defined therein to threadedly engage the male screw thread of said shaft part, the cone nut being attached to said shaft part with an edge of a smaller diameter of the cone nut engaging in a tip portion of said spreading sleeve; and a connecting nut formed by a metal member of a predetermined length in the axial direction that includes a first attachment hole at one end surface and a second attachment hole at an opposite end surface with a female screw thread to receive said shaft part therein, a bolt different from said shaft part being attached to said first attachment hole to connect in the axial direction, wherein said connecting nut includes a breaking groove provided at an outer side surface of said metal member, said breaking groove being placed at a predetermined position at an outer surface of a portion in which said first attachment hole is defined, and said shaft part attached to said second attachment hole is caused to rotate in response to the rotation of one end portion between the one end surface and said breaking groove of said connecting nut to drive said cone nut into said spreading sleeve, thereby causing said spreading parts to spread outwardly, and a torque equal to or greater than a fixed value exerted on said one end portion between the one end surface and said breaking groove of said connecting nut causes said breaking groove to be broken, thereby causing said one end portion between the one end surface and said breaking groove of said connecting nut to be removed.

17. A clamping nut formed by a metal member of a predetermined length in the axial direction that includes a circular hole having an inner diameter of a predetermined length at one end surface and a screw hole with a female screw thread at an opposite end surface, wherein the circular hole includes a non-threaded portion located adjacent to the one end surface of the metal member, the non-threaded portion having a substantially constant inner diameter, said clamping nut causing a bolt to attach to said screw hole to clamp, wherein said clamping nut includes a breaking groove provided at an outer side surface of said metal member, said breaking groove being placed entirely at an axial position along the clamping nut, the axial position contained within an axial extent of the non-threaded portion, and a torque equal to or greater than a fixed value exerted on one end portion between the one end surface and said breaking groove causes said breaking groove to be broken, thereby causing said one end portion between the one end surface and said breaking groove of said metal member to be removed.

18. The clamping nut according to claim 17, wherein
said clamping nut further includes a cap member set in said circular hole, said cap member including a wall section contacted by an inner side surface of said circular hole in said breaking groove, and breaking in said breaking groove causes said cap member to be removed from said metal member together with said one end portion between the one end surface and said breaking groove.

19. The clamping nut according to claim 17, further comprising a diameter reduction adjacent to the non-threaded portion, the diameter reduction section having a decreasing inner diameter.

20. An anchor, comprising:
a shaft part with a male screw thread;
a spreading sleeve including spreading parts formed at a tip portion of a tubular body that permits said shaft part to pass therethrough, the spreading parts being formed by a longitudinally cut slot in such a manner that the spreading parts spread outwardly;

a cone nut having the outer diameter of which gradually reduces in the axial direction of said shaft part, the cone nut including a screw through hole defined therein to threadedly engage the male screw thread of said shaft part, the cone nut being attached to said shaft part with an edge of a smaller diameter of the cone nut engaging in a tip portion of said spreading sleeve; and a clumping nut formed by a metal member of a predetermined length in the axial direction that has a circular hole having an inner diameter of a predetermined length at one end surface and a screw hole with a female screw thread to receive said shaft part therein at an opposite end surface, wherein the circular hole includes a non-threaded portion located adjacent to the one end surface of the metal member, the non-threaded portion having a substantially constant inner diameter, wherein said clumping nut includes a breaking groove provided at an outer side surface of said metal member, said breaking groove being placed entirely at an axial position along the clamping nut, the axial position contained within an axial extent of the non-threaded portion, and said shaft part attached to said screw hole is caused to rotate in response to the rotation of one end portion between the one end surface and said breaking groove of said clumping nut to drive said cone nut into said spreading sleeve, thereby causing said spreading parts to spread outwardly, and a torque equal to or greater than a fixed value exerted on said one end portion between the one end surface and said breaking groove of said clumping nut causes said breaking groove to be broken, thereby causing said one end portion between the one end of said clumping nut and said breaking groove of said clumping nut to be removed.

21. The anchor according to claim 20, further comprising a diameter reduction adjacent to the non-threaded portion, the diameter reduction section having a decreasing inner diameter.

22. An anchor bolt comprising:
a shaft part with a male screw thread; and
a head part connected to said shaft part and having an attachment hole with a closed-end bottom to receive a bolt therein defined at a tip surface of said head part and a breaking groove provided at an outer side surface of said head part, wherein said breaking groove is formed at an outer surface of a portion in which said attachment hole is defined, a torque equal to or greater than a fixed value exerted on a tip portion between the tip surface and said breaking groove of said head part causes said breaking groove to be broken, thereby causing the tip portion between said tip surface and said breaking groove of said head part to be removed, and the head part is threadedly connected to the shaft part.

* * * * *